(12) United States Patent
Ohashi

(10) Patent No.: US 7,610,986 B2
(45) Date of Patent: Nov. 3, 2009

(54) HST UNIT

(75) Inventor: Ryota Ohashi, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 11/873,855

(22) Filed: Oct. 17, 2007

(65) Prior Publication Data

US 2008/0034747 A1 Feb. 14, 2008

Related U.S. Application Data

(63) Continuation of application No. 11/431,662, filed on May 11, 2006.

(30) Foreign Application Priority Data

| May 18, 2005 | (JP) | ............................. 2005-145821 |
| Jun. 3, 2005 | (JP) | ............................. 2005-164013 |
| Jun. 8, 2005 | (JP) | ............................. 2005-168560 |

(51) Int. Cl.
   *B60K 17/356* (2006.01)
(52) U.S. Cl. ...................... 180/305; 180/308
(58) Field of Classification Search ................. 180/305, 180/306, 307, 308, 291, 312
   See application file for complete search history.

(56) References Cited

U.S. PATENT DOCUMENTS

| 4,809,796 | A | * | 3/1989 | Yamaoka et al. ........... 180/6.48 |
| 5,918,691 | A | * | 7/1999 | Ishii .......................... 180/6.48 |
| 5,957,229 | A | * | 9/1999 | Ishii .......................... 180/6.48 |
| 6,425,244 | B1 | | 7/2002 | Ohashi et al. |
| 6,578,656 | B2 | * | 6/2003 | Samejima et al. ........... 180/291 |
| 6,758,290 | B2 | * | 7/2004 | Jolliff et al. ................ 180/6.48 |
| 6,811,509 | B1 | * | 11/2004 | Langenfeld et al. ........... 475/83 |
| 6,902,027 | B2 | * | 6/2005 | Soga et al. .................... 180/308 |
| 7,081,061 | B1 | * | 7/2006 | Langenfeld et al. ........... 475/83 |
| 7,363,759 | B2 | * | 4/2008 | Ohashi et al. ................ 60/468 |
| 7,370,714 | B2 | * | 5/2008 | Yasuda et al. .............. 180/53.4 |
| 7,383,683 | B1 | * | 6/2008 | Rawski ......................... 60/487 |
| 7,415,823 | B2 | * | 8/2008 | Iwaki et al. .................. 60/487 |
| 7,430,862 | B2 | * | 10/2008 | Abend et al. .................. 60/487 |
| 7,434,651 | B2 | * | 10/2008 | Abend et al. ................ 180/305 |
| 7,445,077 | B2 | * | 11/2008 | Abend et al. ............... 180/305 |
| 7,448,209 | B2 | * | 11/2008 | Abend et al. .................. 60/484 |
| 2006/0272496 | A1 | | 12/2006 | Ohashi |
| 2007/0029118 | A1 | * | 2/2007 | Acharya et al. ............ 180/53.4 |
| 2008/0034747 | A1 | * | 2/2008 | Ohashi ........................ 60/464 |
| 2008/0120974 | A1 | * | 5/2008 | Dong et al. ................... 60/464 |

OTHER PUBLICATIONS

Office Action mailed Dec. 23, 2008 for U.S. Appl. No. 11/431,662 to Ohashi, filed Apr. 11, 2006, 6 pgs.

* cited by examiner

*Primary Examiner*—Jeffrey J Restifo
(74) *Attorney, Agent, or Firm*—Sterne, Kessler, Goldstein & Fox P.L.L.C.

(57) ABSTRACT

There is provided an HST unit including: a first hydraulic motor unit for operatively driving one of a pair of driving wheels; a second hydraulic motor unit for operatively driving the other one of the pair of driving wheels; a hydraulic pump unit operatively connected to a driving power source, the hydraulic pump unit configuring a traveling hydrostatic transmission in cooperation with the first and second hydraulic motor units; and an attachment frame for supporting the first hydraulic motor unit, the second hydraulic motor unit and the hydraulic pump unit, the attachment frame being attachable to a vehicle frame.

6 Claims, 28 Drawing Sheets

HST UNIT

CROSS REFERENCE TO RELATED APPLICATIONS

This application is a continuation of U.S. application Ser. No. 11/431,662, now pending, which is hereby incorporated by reference in its entirety.

BACKGROUND OF THE INVENTION

1. Field of the Invention

The present invention relates to an HST unit including a pair of hydraulic motor units, each hydraulic motor unit being independently arrangeable, and a hydraulic pump unit forming a traveling hydrostatic transmission in cooperation with the pair of hydraulic motor units.

2. Related Art

It has been conventionally known to form a traveling hydrostatic transmission by fluidly connecting the hydraulic pump unit and the hydraulic motor unit, which are arranged spaced apart from each other, by way of a conduit.

Such configuration is particularly useful in a working vehicle needing to provide a space between a pair of driving wheels so as to stabilize the body posture at the time of turning such as a mower tractor capable of turning in place (zero turn) (for example, see U.S. Pat. No. 6,425,244).

However, with the conventional configuration, the hydraulic pump unit and the hydraulic motor unit have to be independently attached to the vehicle main body, and then be fluidly connected by the conduit, in the assembly work to the vehicle main body, resulting in a worse assembly workability.

Furthermore, the adjustment work of the traveling hydrostatic transmission configured by the hydraulic pump unit and the hydraulic motor units is desirably performed in a state where the hydraulic pump unit and the hydraulic motor unit fluidly connected according to the usage conditions. However, with the conventional configuration, such adjustment work can only be performed after the hydraulic pump unit and the hydraulic motor units are attached to the vehicle main body.

Moreover, in some specified cases, a reservoir tank that is an oil source of the operational fluid in the traveling hydrostatic transmission may be provided. However, with the conventional configuration, the attachment of the reservoir tank to the vehicle main body also has to be performed independently from the hydraulic pump unit and the hydraulic motor units.

In view of the conventional techniques, the present invention aims to provide an HST unit that enhances the efficiency of the fluidly connecting work, the adjustment work and the attachment work to the vehicle main body, of the hydraulic pump unit and the hydraulic motor units configuring the traveling hydrostatic transmission.

SUMMARY OF THE INVENTION

The present invention provides an HST unit, which is applied to a working vehicle, including a first hydraulic motor unit including a first motor shaft and a first hydraulic motor main body supported by the first motor shaft in a relatively non-rotatable manner; a second hydraulic motor unit including a second motor shaft and a second hydraulic motor main body supported by the second motor shaft in a relatively non-rotatable manner; and a hydraulic pump unit including first and second pump shafts, and first and second hydraulic pump main bodies respectively supported by the first and second pump shafts in a relatively non-rotatable manner; wherein the hydraulic pump unit, the first and second hydraulic motor units form an assembly capable of being integrally and detachably mounted to the working vehicle in a state that the first and second hydraulic pump main bodies are fluidly connected to the first and second hydraulic motor main bodies, respectively.

According to the present invention, it is possible to enhance the efficiency of the attachment work of the hydraulic pump unit, the first hydraulic motor unit and the second hydraulic motor unit to the working vehicle.

Further, it is possible to fluidly connect the hydraulic pump unit to the first and second hydraulic motor units without actually attaching these hydraulic units to the working vehicle. Therefore, the fluidly connecting work becomes more efficient, and the adjusting work of the traveling hydrostatic transmission could be performed irrespective of a vehicle main body of the working vehicle, thereby improving the efficiency of the adjusting work. The effects are particularly effective in a case where the hydraulic equipment manufacturing company manufactures the hydraulic pump unit, the first hydraulic motor unit and the second hydraulic motor unit, and the vehicle manufacturing company attaches the hydraulic units to the vehicle frame to complete the working vehicle.

Preferably, the first and second hydraulic motor units are respectively positioned on one side and the other side along a first direction with the hydraulic pump unit therebetween so that the first and second hydraulic motor units are respectively positioned on first and second sides in a vehicle width direction with reference to the hydraulic pump unit when the HST unit is mounted to the working vehicle. The first hydraulic motor unit includes a first motor case accommodating the first hydraulic motor main body and supporting the first motor shaft in a rotatable manner around its axis line. The second hydraulic motor unit includes a second motor case accommodating the second hydraulic motor main body and supporting the second motor shaft in a rotatable manner around its axis line. The first motor shaft has an output end extending outward from the first motor case toward the one side along the first direction. The second motor shaft is positioned coaxially with the first motor shaft and has an output end extending outward from the second motor case toward the other side along the first direction.

According to the configuration, it is possible to easily connect the first and second motor shaft to a pair of driving wheels positioned away from each other in the width direction of the vehicle.

More preferably, the hydraulic pump unit includes a pump case accommodating first and second hydraulic pump main bodies and supporting the first and second pump shafts in a relatively rotatable manner around respective axis lines. The pump case is disposed so that at least part of the pump case is positioned at the same position as the first and second motor cases with respect to the longitudinal direction of the working vehicle when the HST unit is mounted to the working vehicle.

According to the configuration, it is possible to mount the assembly formed by the hydraulic pump unit and the first and second hydraulic motor units to the working vehicle in a stable manner.

For example, the hydraulic pump unit includes a power transmission mechanism accommodated in the pump case and operatively connecting the first and second pump shafts. The first and second pump shafts are orthogonal to the first and second motor shafts. One of the first and second pump shafts includes an input end extending outward from the pump case so as to be capable of operatively connecting to a driving source in the working vehicle.

In the above various configurations, the HST unit preferably includes a reservoir tank for storing an operational fluid used in the HST unit, the reservoir tank being supported by the assembly.

According to the configuration, it is possible to enhance the efficiency of the attachment work of the reservoir tank to the working vehicle.

Further, it is possible to fluidly connect the reservoir tank and the HST before attaching the reservoir tank, and the hydraulic pump unit and the first and second hydraulic motor units forming the HST, thereby enhancing the efficiency of the fluidly connecting work.

More preferably, the HST unit further includes a filter unit for filtering the operational fluid flown into the HST unit from the reservoir tank, the filter unit being supported by the assembly.

According to the configuration, it is possible to enhance the efficiency of the attachment work of the filter unit to the working vehicle.

Further, it is possible to fluidly connect the reservoir tank and the HST through the filter unit before attaching the reservoir tank and the HST, thereby enhancing the efficiency of the fluidly connecting work.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

First Embodiment

The first preferred embodiment of the HST unit according to the present invention will now be described with reference to the accompanied drawings.

Figure 1:
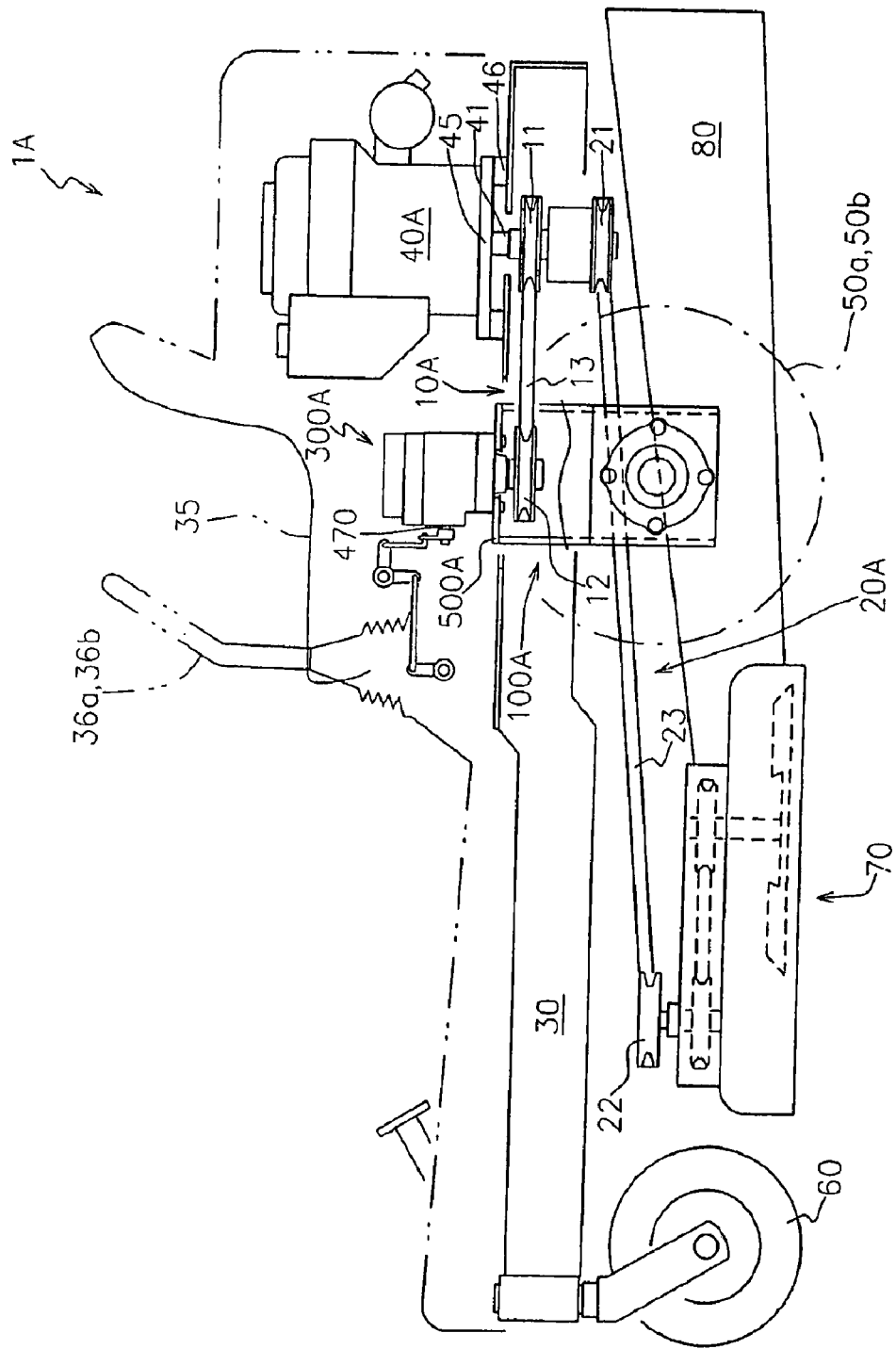
FIG. 1 is a side view of a working vehicle to which an HST unit according to a first embodiment of the present invention.
Figure 2:
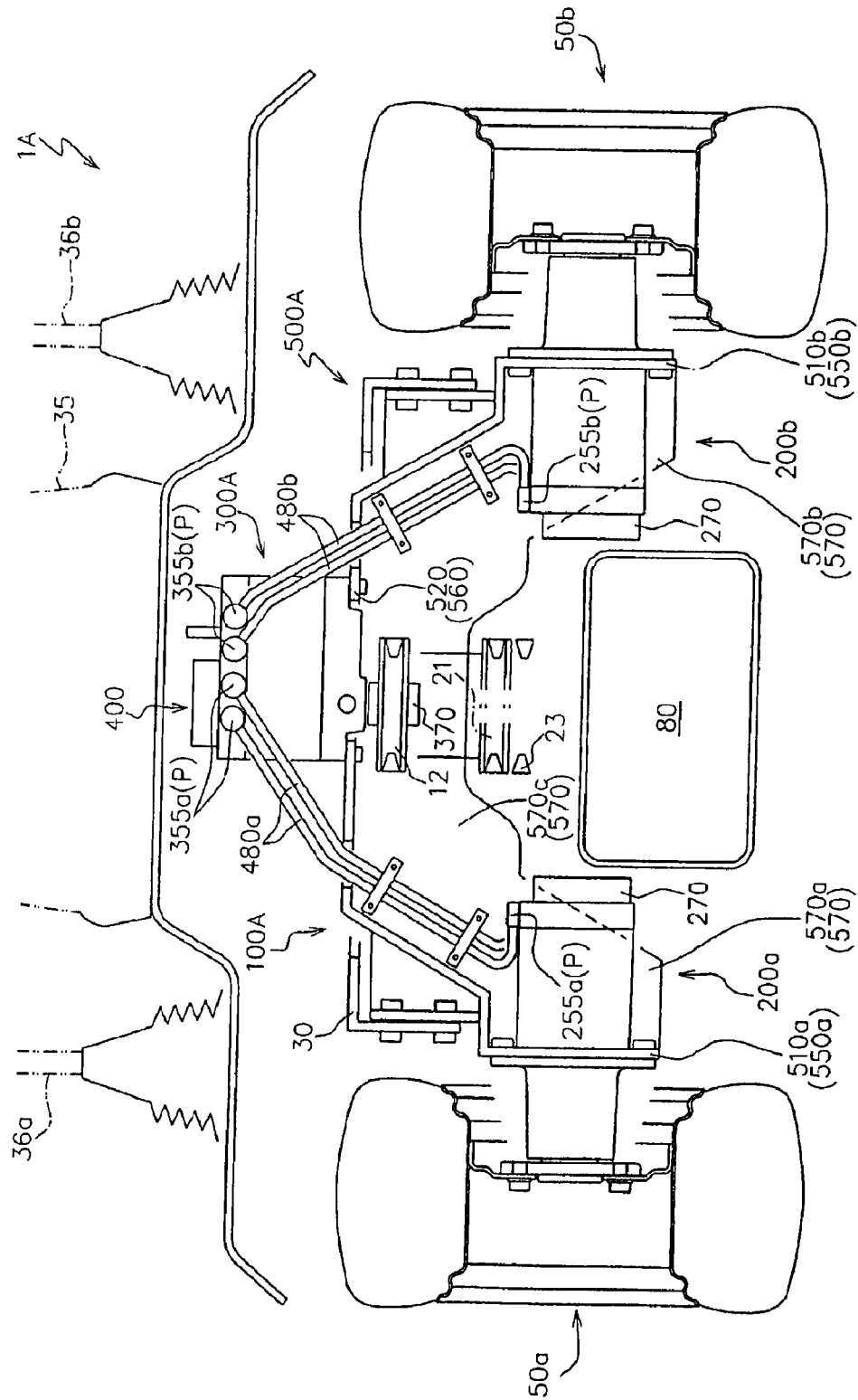
FIG. 2 is a partial rear view of the working vehicle shown in FIG. 1.

FIG. 1 and FIG. 2 are a side view and a partial rear view, respectively, of a working vehicle 1A to which the HST unit 100A according to the present embodiment is applied.

As shown in FIG. 1 and FIG. 2, the working vehicle 1A includes a vehicle frame 30, a driving power source 40A supported by the vehicle frame 30, the HST unit 100A configuring the traveling hydrostatic transmission, a traveling system power transmission mechanism 10A for transmitting the power from the driving power source 40A to the HST unit 100A, a pair of first driving wheel 50a and second driving wheel 50b (rear wheels in the present embodiment), and caster wheels 60 (front wheels in the present embodiment).

In the present embodiment, the working vehicle 1A is of a rear discharge type riding lawn mower.

That is, the working vehicle 1A further includes a driver's seat 35, a working machine 70 (mower device in the present embodiment) suspended and supported between the driving wheels 50 and the caster wheels 60 in a state of capable of lifting upwardly and downwardly, a PTO system power transmission mechanism 20A for transmitting the power from the driving power source 40A to the working machine 70, and a duct 80 for guiding the grass cut by the working machine 70 to a grass collecting bag (not shown) arranged at the back of the vehicle body.

The HST unit 100A is configured so as to form the traveling hydrostatic transmission while providing a free space between the pair of driving wheels 50a, 50b.

Specifically, as shown in FIG. 1 and FIG. 2, the HST unit 100A includes; a first hydraulic motor unit 200a for operatively driving the first driving wheel 50a; a second hydraulic motor unit 200b for operatively driving the second driving wheel 50b; a hydraulic pump unit 300A operatively connected to the driving source 40A, the hydraulic pump unit 300A being fluidly connected to the first and second hydraulic motor units 200a, 200b; and an attachment frame 500A for supporting the hydraulic pump unit 300A, the first hydraulic motor unit 200a and the second hydraulic motor unit 200b so as to define a free space between the first and second driving wheels 50a, 50b.

At least one of the hydraulic pump unit 300A, and the first and second hydraulic motor units 200a, 200b is (are) of a variable displacement type.

In the present embodiment, the hydraulic pump unit 300A is of the variable displacement type, and the first and second hydraulic motor units 200a, 200b are of the fixed displacement type.

Figure 3:
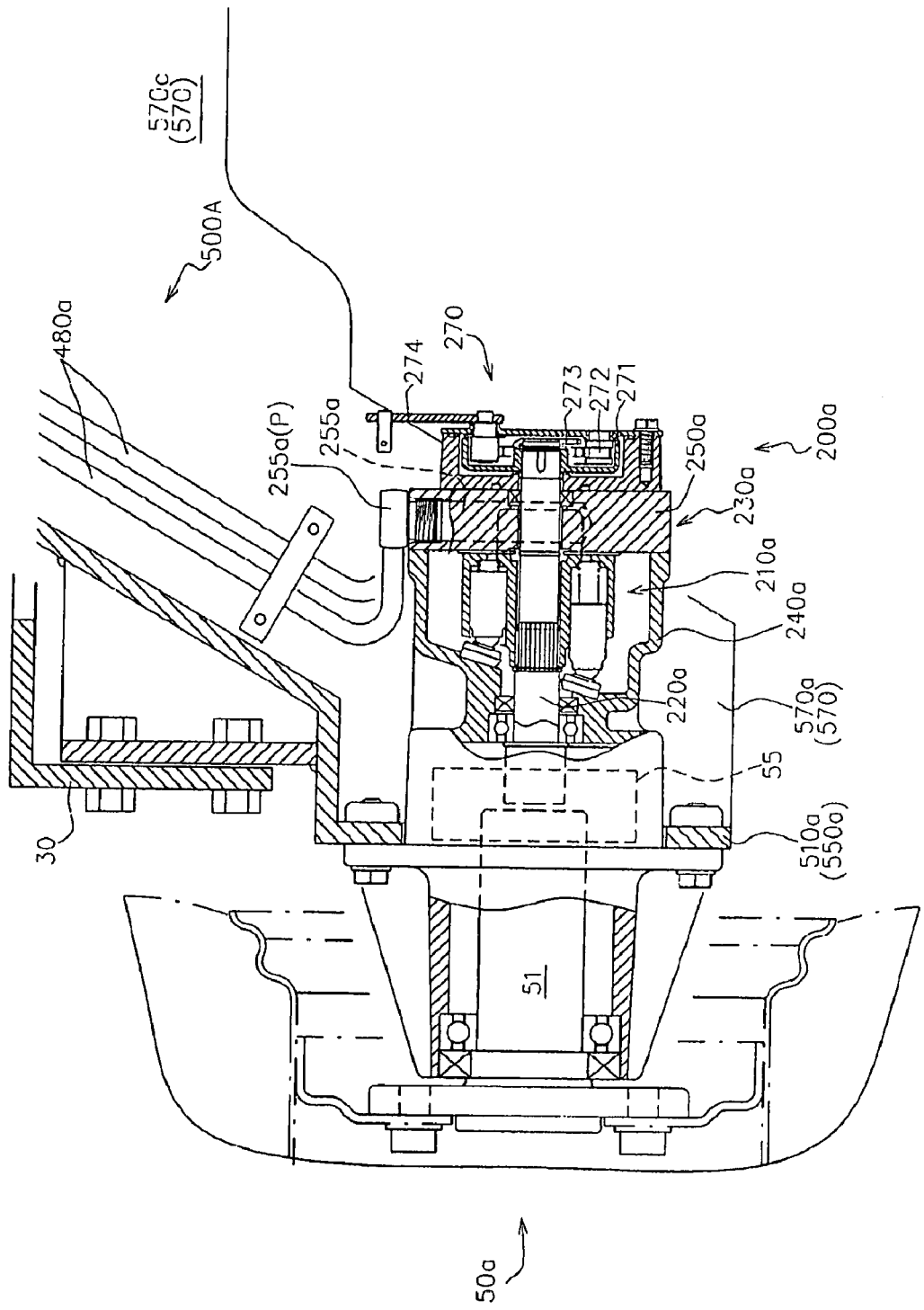
FIG. 3 is a vertical sectional rear view in the vicinity of a first hydraulic motor unit in the HST unit according to the first embodiment.

FIG. 3 shows a vertical sectional rear view in the vicinity of the first hydraulic motor unit 200a.

The second hydraulic motor unit 200b has substantially the same configuration as that of the first hydraulic motor unit 200a.

Therefore, the corresponding members of the second hydraulic motor unit 200b are designated by the same reference numerals or the same reference numerals with replacing subscript with b as those of the first hydraulic motor unit 200a, and thus the detailed description thereof is omitted.

As shown in FIG. 3, the first hydraulic motor unit 200a is configured so as to operatively drive the corresponding first driving wheel 50a.

Specifically, the first hydraulic motor unit 200a includes a first hydraulic motor main body 210a, a first motor shaft 220a rotationally driven about the axis line by the first hydraulic motor main body 210a, and a first motor case 230a for accommodating the first hydraulic motor main body 210a and for supporting the first motor shaft 220a in a rotatable manner about the axis line.

The first motor case 230a includes a motor case main body 240a having an opening, through which the first hydraulic motor main body 210a can be inserted, formed on the first end face (end face facing inward in the vehicle width direction in a state mounted to the vehicle frame 30 in the present embodiment), and a first motor-side port block 250a (first motor-side center section) coupled to the motor case main body 240a so as to close the opening.

The first motor-side port block 250a is provided with a pair of first hydraulic motor-side operational fluid passages 255a having first ends fluidly connected to the first hydraulic motor main body 210a and second ends opened to the outer surface.

The second ends of the pair of first hydraulic motor-side operational fluid passages 255a form first hydraulic motor-side operational fluid ports 255a(P) which act as fluid connecting ports to the first hydraulic pump main body 310a, to be hereinafter described.

The first motor shaft 220a has a first end operatively connected to a driving axle 51 for the first driving wheel 50a.

Preferably, the first motor shaft 220a is operatively connected to the corresponding driving axle 51 via a reduction transmission mechanism 55, as shown in FIG. 3.

With the reduction transmission mechanism 55, capacity of the first hydraulic motor main body 210a could be made smaller.

In this embodiment, a planetary gear mechanism is employed as the reduction transmission mechanism 55, and the corresponding motor shaft and the vehicle shaft are concentrically arranged. Alternatively, it is possible to have the corresponding motor shaft and the driving axle off set to each other, and employ one or a plurality of gear trains arranged on the two axle arranged parallel to each other as the reduction transmission mechanism.

Further, the reduction transmission mechanism 55 may be omitted by increasing the capacity of the first hydraulic motor main body 210a.

In the present embodiment, the first hydraulic motor unit 200a has, in addition to the above configuration, a brake mechanism 270 that selectively applies a braking force to the first motor shaft 220a.

Specifically, the first motor shaft 220a has a second end (end opposite the first end operatively connected to the first driving wheel 50a) extending outward from the first motor-side port block 250a.

The brake mechanism 270 is configured so as to selectively apply the braking force to the second end of the first motor shaft 220 based on external operation.

The brake mechanism 270 is of an internal expanding type in the present embodiment.

Specifically, the brake mechanism 270 includes a brake drum 271 supported in a relatively non-rotatable manner at the second end of the first motor shaft 220a, a brake shoe 272 arranged facing the inner peripheral surface of the brake drum 271, a biasing member 273 for biasing the brake shoe 272 in a direction away from the inner peripheral surface of the brake drum 271, and a brake operation arm 274 for pushing the brake shoe 272 toward the inner peripheral surface of the brake drum 271 against the biasing force of the biasing member 273.

Although the inner expanding brake device is adopted as the brake mechanism 270 in the present embodiment, other brake devices such as a disc brake device could obviously be used.

Figure 4:
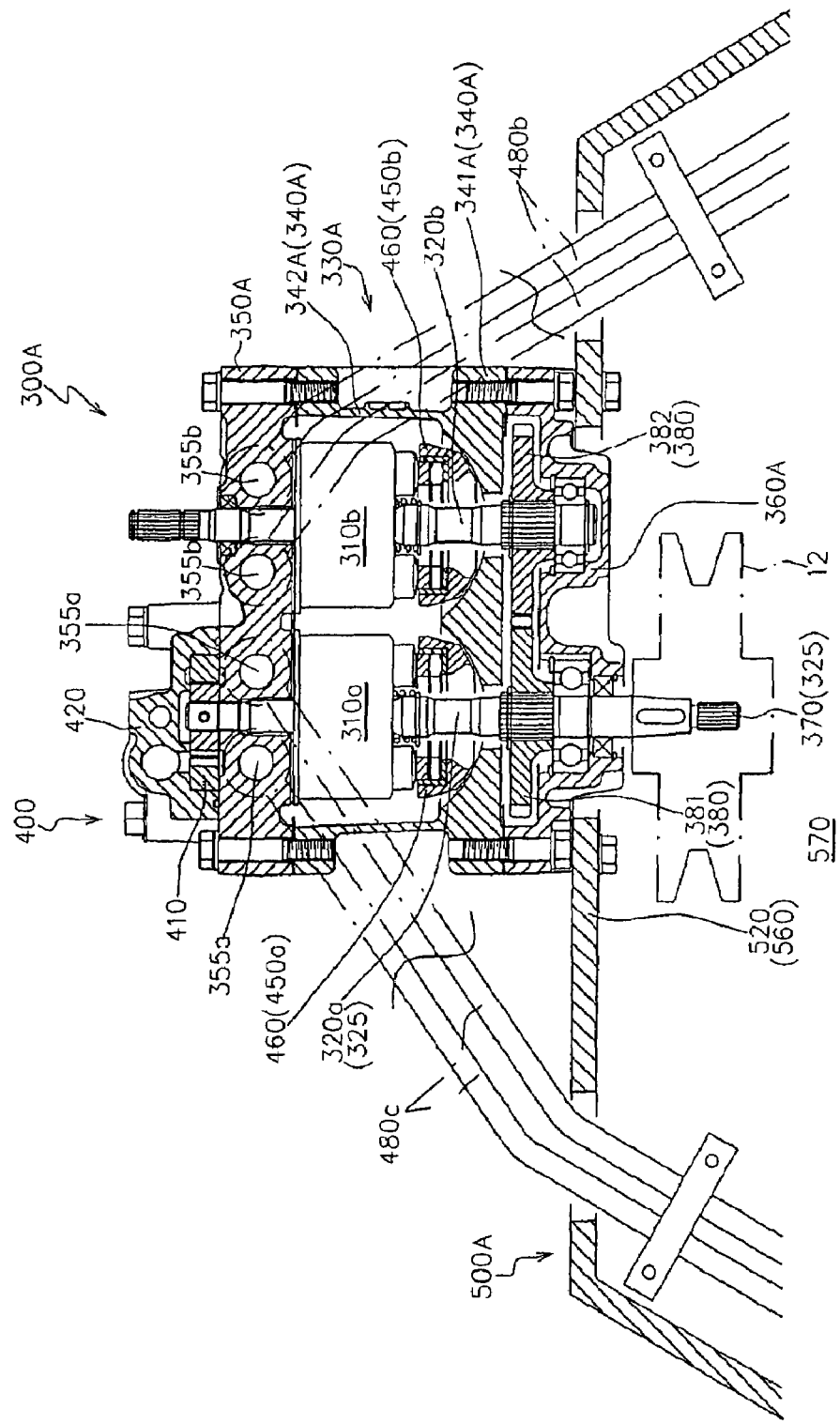
FIG. 4 is a vertical sectional rear view in the vicinity of a hydraulic pump unit in the HST unit according to the first embodiment.

FIG. 4 shows a vertical sectional rear view in the vicinity of the hydraulic pump unit 300A.

In the present embodiment, the hydraulic pump unit 300A includes a first hydraulic pump main body 310a and a second hydraulic pump main body 310b that are fluidly connected to the first hydraulic motor main body 210a and the second hydraulic motor main body (not shown), respectively. Herein, the first and second hydraulic pump main bodies 310a, 310b are accommodated in a single pump case 330A, as shown in FIG. 4.

Specifically, the hydraulic pump unit 300A includes an input shaft 370 operatively connected to the driving power source 40A, first and second pump shafts 320a, 320b, a transmission mechanism 380 for transmitting the power from the input shaft 370 to the first and second pump shafts 320a, 320b, the first and second hydraulic pump main bodies 310a, 310b that are supported in a relatively non-rotatable manner at the first and second pump shafts 320a, 320b, respectively, and a pump case 330A for accommodating the first and second hydraulic pump main bodies 310a, 310b and for supporting the input shaft 370, and the first and second pump shafts 320a, 320b in a rotatable manner about the respective axis line.

In the present embodiment, the hydraulic pump unit 300A is of a variable displacement type, as mentioned above.

Therefore, the hydraulic pump unit includes first and second capacity adjusting mechanisms 450a, 450b for respectively changing the supply/suction amount of the first and second hydraulic pump main bodies 310a, 310b based on external operation, in addition to the above configuration.

The first and second capacity adjusting mechanisms 450a, 450b each includes an output adjusting member 460 (see FIG. 4) such as a movable swash plate for changing the supply/suction amount of the corresponding hydraulic pump main body 310, and a control shaft 470 (see FIG. 1) for tilting the output adjusting member 460 based on external operation.

Each control shaft 470 of the first and second capacity adjusting mechanisms 450a, 450b is operatively connected to a pair of steering levers 36a, 36b, respectively, arranged at the front of the driver's seat 35 by way of appropriate link mechanisms 37a, 37b (see FIG. 1).

The pump case 330A includes a pump case main body 340A, a pump-side port block 350A (pump-side center section) detachably coupled to the pump case main body 340A, and a lid member 360A detachably coupled to the pump case main body 340A.

As shown in FIG. 4, the pump case main body 340A has an end wall 341A that extends in a direction substantially orthogonal to the axis line direction of the pump shafts 320a, 320b, and a peripheral wall 342A extending in the axis line direction of the pump shafts 320a, 320b from the peripheral edge of the end wall 341A.

The peripheral wall 342 has an opening at a free end side opposite the end wall 341a.

The opening is sized to allow the first and second hydraulic pump main bodies 310a, 310b to be inserted.

The pump-side port block 350A is coupled to the pump case main body 340A so as to close the opening.

In other words, a pump accommodating space for accommodating the first and second hydraulic pump main bodies 310a, 310b is defined by the end wall 341A and the peripheral wall 342A of the pump case main body 340A, and the pump-side port block 350A.

The pump-side port block 350A is provided with a pair of first hydraulic pump-side operational fluid passages 355a having first ends fluidly connected to the first hydraulic pump main body 310a and second ends opened to the outer surface, and a pair of second hydraulic pump-side operational fluid passages 355b having first ends fluidly connected to the second hydraulic pump main body 310b and second ends opened to the outer surface.

The second ends of the pair of first hydraulic pump-side operational fluid passages 355a form first hydraulic pump-side operational fluid ports 355a(P) which act as the fluid connecting ports to the first hydraulic motor main body 210a (see FIG. 2).

The second ends of the pair of second hydraulic pump-side operational fluid passages 355b form second hydraulic pump-side operational fluid ports 355b(P) which act as the fluid connecting ports to the second hydraulic motor main body (see FIG. 2).

The lid member 360A is coupled to the pump case main body 340A so as to define a transmission mechanism accommodating space for accommodating the transmission mechanism 380 in cooperation with the end wall 341A.

The input shaft 370 is supported by the pump case 330A so that one end forming the input end extends outward.

The first and second pump shafts 320a, 320b are supported at the both ends by the lid member 360A and the pump-side port block 350A so as to support the corresponding hydraulic pump main bodies 310a, 310b within the pump accommodating space.

The transmission mechanism 380 is configured to transmit the power from the input shaft 370 to the first and second pump shafts 320a, 320b.

In the present embodiment, the first pump shaft 320a and the input shaft 370 are integrally formed by a single shaft 325, as shown in FIG. 4.

Therefore, the transmission mechanism 380 includes a driving gear 381 supported in a relatively non-rotatable manner at the single shaft 325, and a driven gear 382 supported in a relatively non-rotatable manner at the second pump shaft 320b so as to engage with the driving gear 381.

Preferably, one of or both of the first and second pump shafts 320a, 320b has (have) at least one end extending outward from the pump case 330A.

The projecting end is used as the driving shaft for the charge pump main body annexed to the hydraulic pump unit 300a or other rotating members, as desired.

In the present embodiment, the input shaft 370 and the first pump shaft 320a are integrally formed by the single shaft 325, as explained above.

As shown in FIG. 4, the single shaft 325 has a first end passing through the lid member 360A and projecting outward to form the input end, and a second end passing through the pump-side port block 350A and extending outward.

The second end of the single shaft 325 acts as the driving shaft for a charge pump main body 410 that is to be hereinafter described.

In the present embodiment, the second pump shaft 320b also has a second end passing through the pump-side port block 350A and extending outward so as to externally output the rotational power, as shown in FIG. 4.

A cooling fan and the like may be arranged at the second end of the second pump shaft 320b.

In the present embodiment, the hydraulic pump unit 300A includes a charge pump unit 400, in addition to the above configuration.

The charge pump unit includes a charge pump main body 410 operatively driven by the rotational power of the input shaft 370, and a charge pump case 420 surrounding the charge pump main body 410, as shown in FIG. 4.

In the present embodiment, the charge pump main body 410 is configured so as to be driven by the second end of the single shaft 325.

The charge pump case 420 is coupled to the pump-side port block 350A so as to surround the charge pump main body 410.

The attachment frame 500A supports the hydraulic pump unit 300A, the first hydraulic motor unit 200a and the second hydraulic motor unit 200b, and is attachable to the vehicle frame 30 in a state of providing a free space between the first and second driving wheels 50a, 50b.

Specifically, the attachment frame 500A has a gate shape when seen from the front, and includes a first motor supporting surface 510a arranged on one side in the vehicle width direction so as to be positioned in the vicinity of the first driving wheel 50a, a second motor supporting surface 510b arranged on the other side in the vehicle width direction so as to be positioned in the vicinity of the second driving wheel 50b, and a pump supporting surface 520 positioned above the first and second motor supporting surfaces 510a, 510b and positioned between the first and second motor supporting surfaces 510a, 510b with respect to the vehicle width direction, in a state attached to the vehicle frame 30, as shown in FIG. 2.

In the HST unit 100A having the thus constructed attachment frame 500A, it is possible to complete the attachment work of the hydraulic pump unit 300A and the first and second hydraulic motor units 200a, 200b to the vehicle frame 30 while providing the free space between the first and second driving wheels 50a, 50b, by attaching the hydraulic pump unit 300A, the first hydraulic motor unit 200a and the second hydraulic motor unit 200b configuring the traveling hydrostatic transmission to the attachment frame 500A in advance, and then attaching the attachment frame 500A to the vehicle frame 30.

Therefore, the efficiency of the assembly work of the vehicle could be enhanced.

Further, the HST 100A is so configured that the hydraulic pump unit 300A, the first hydraulic motor unit 200a and the second hydraulic motor unit 200b are independently supported by the attachment frame 500A. Therefore, the replacing work and the maintenance work of the hydraulic units can be easily carried out.

Furthermore, in the HST unit 100a, the conduit connecting work between the first and second hydraulic pump main bodies 310a, 310b, and the first and second hydraulic motor main bodies 210a, 210b can also be carried out without assembling the hydraulic pump unit 300A as well as the first and second hydraulic motor units 200a, 200b to the vehicle frame 30.

In other words, in the HST 100A, it is possible to complete the connecting work between the first hydraulic pump main body 310a and the first hydraulic motor main body 210a by fluidly connecting the first hydraulic pump-side operational fluid ports 355a(P) and the first hydraulic motor-side operational fluid ports 255a(P) by means of the first operational fluid conduit 480a; and complete the connecting work between the second hydraulic pump main body 310b and the second hydraulic motor main body by fluidly connecting the second hydraulic pump-side operational fluid ports 355a(P) and the second hydraulic motor-side operational fluid ports 255b(P) by means of the second operational fluid conduit 480b, in a state where the hydraulic pump unit 300A as well as the first and second hydraulic motor units 200a, 200b are attached only to the attachment frame 500A, without attaching to the vehicle frame.

That is, in the HST unit 100A, the conduit connecting work could be carried out irrespective of the assembly work to the vehicle frame.

The first operational fluid conduit 480a and the second operational fluid conduit 480b are preferably supported by the attachment frame 500A, as shown in FIG. 2.

Further, the adjustment work of the traveling hydrostatic transmission configured by the hydraulic pump unit 300A as well as the first and second hydraulic motor units 200a, 200b could be more efficient in the HST unit 100A.

Specifically, in the HST unit 100A, it is possible that the first and second hydraulic pump main bodies 310a, 310b and the first and second hydraulic motor main bodies are fluidly connected in a state corresponding to the usage state before attaching the hydraulic pump unit 300A, the first hydraulic motor unit 200a and the second hydraulic motor unit 200b to the vehicle frame 30, as explained above.

Therefore, the adjustment work of the traveling hydrostatic transmission could be carried out irrespective of the vehicle main body.

In particular, in a case where the hydraulic equipment manufacturing company manufactures the hydraulic pump unit and the hydraulic motor unit, and the vehicle manufacturing company attaches the hydraulic pump unit and the hydraulic motor unit to the vehicle frame and completes the working vehicle, the HST unit 100A allows the hydraulic equipment manufacturing company to carry out the adjustment work of the hydraulic pump unit and the hydraulic motor unit in a state corresponding to the vehicle mounted state before shipment of the traveling hydrostatic transmission. Therefore, the vehicle manufacturing company could assembles the traveling hydrostatic transmission to the vehicle frame, only with an extremely simple work of attaching the attachment frame to the vehicle frame.

Further, the attachment frame 500A is configured so as to have the first and second motor supporting surfaces 510a, 510b positioned respectively at one side and the other side in the vehicle width direction and have a gate shape when seen from the front, in a state of being attached to the vehicle frame 30, as described above.

Therefore, the pair of hydraulic motor units 200a, 200b can be arranged in a distributed manner in the vehicle width direction, and the free space can be secured between the driving wheels 50a, 50b by simply attaching the attachment frame 500A to the vehicle frame 30.

Such effect is particularly effective in the working vehicle, for example, needing to stabilize the body posture at the time of turning in place (zero turn).

In the working vehicle, a PTO system power transmission mechanism 20A and the duct 80 are arranged in the free space, as shown in FIG. 2.

In the working vehicle 1A, the driving power source 40A is of a vertical crank shaft type, and the traveling system power transmission mechanism 10A and the PTO system power transmission mechanism 20A are both of pulley-belt mechanism, as shown in FIG. 1 and FIG. 2.

Specifically, the driving power source 40A is supported by the vehicle frame 30 by way of a flat plate 45 arranged on the rear side of the vehicle frame 30 so that the driving shaft 41 lies in the vertical direction.

An opening through which the driving shaft 41 is inserted is formed in the flat plate 45.

The driving power source 40A is mounted on the upper surface of the flat plate 45 so that the shaft end of the driving shaft 41 is positioned below the flat plate 45 through the opening.

Preferably, the flat plate 45 is supported by the vehicle frame 30 by way of elastic members 46, so that vibration from the driving power source 40A is effectively prevented from transmitting to the vehicle frame 30.

The traveling system power transmission mechanism 10A includes a travel driving pulley 11 attached to the driving shaft 41 of the driving power source 40A so as to be positioned below the flat plate 45, a travel driven pulley 12 attached to the input shaft 370 of the hydraulic pump unit 300A, and a travel belt 13 wound around the travel driving pulley 11 and the travel driven pulley 12.

The PTO system power transmission mechanism 20A includes a working machine driving pulley 21 attached to the driving shaft 41 of the driving power source 40A so as to be positioned below the flat plate 45, a working machine driven pulley 22 attached to the input shaft of the working machine 70, and a working machine belt 23 wound around the working machine driving pulley 21 and the working machine driven pulley 22.

In order to simplify the connecting structure between the vertical crank shaft type driving power source 40A and the hydraulic pump unit 300A, the pump supporting surface 520 is configured so as to support the hydraulic pump unit 300A with the input shaft 370 lying in the vertical direction in a state where the attachment frame 500A is attached to the vehicle frame 30 in the present embodiment.

Specifically, the attachment frame 500A includes a first side plate 550a extending substantially vertically on one side in the vehicle width direction so as to face the first driving wheel 50a, a second side plate 550b extending substantially vertically on the other side in the vehicle width direction so as to face the second driving shaft 50b, a top plate 560 being substantially horizontally above the first and second side plates 550*a*, 550*b* and at the center in the vehicle width direction, and a connecting plate 570 extending substantially vertically so as to connect the first and second side plates 550*a*, 550*b* and the top plate 560, with the state attached to the vehicle frame 30 as the reference, as shown in FIG. 2.

The top plate 560 configures the pump supporting surface 520, and the first and second side plates 550*a*, 550*b* configure the first and second motor supporting surfaces 510*a*, 510*b*, respectively.

The connecting plate 570 has a gate shape when seen from the front, and includes a first portion 570*a* extending upward from the first side plate 550*a*, a second portion 570*b* extending upward from the second side plate 550*b*, and a connecting portion 570*c* connecting the upper parts of the first portion 570*a* and the second portion 570*b*, as shown in FIG. 2, so that the strength of the attachment frame 500A is ensured while providing the free space between the first and second driving wheels 50*a*, 50*b*.

As shown in FIG. 2, an opening is formed at the top plate 560, and the hydraulic pump unit 300A is supported on the upper surface of the top plate 560 with the input shaft 370 extending downward through the opening.

The travel driven pulley 12 is attached to the input shaft 370 below the top plate 560.

Second Embodiment

The second embodiment of the HST unit according to the present invention will now be described with reference to the accompanied drawings.

Figure 5:
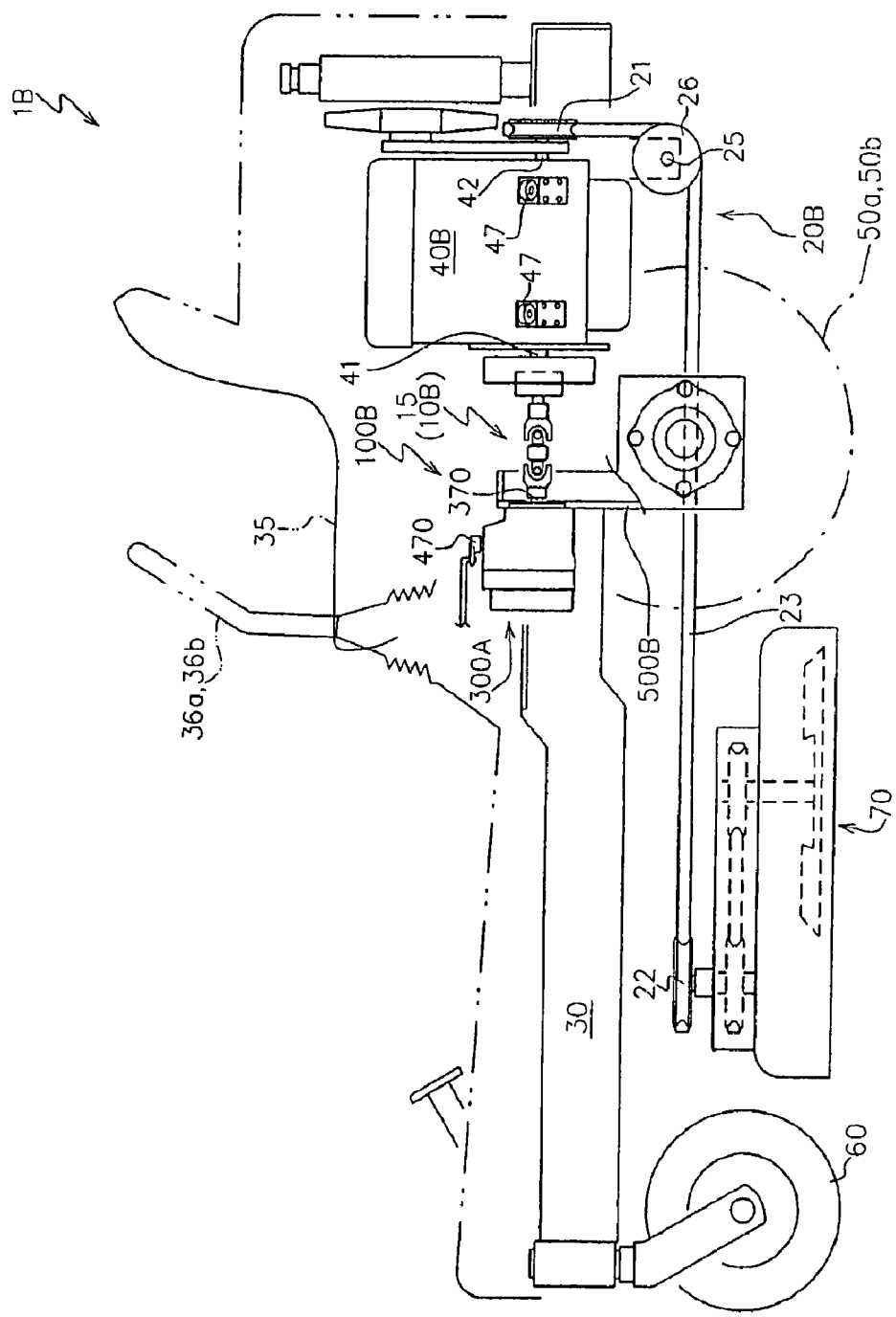
FIG. 5 is a side view of a working vehicle to which an HST unit according to a second embodiment of the present invention is applied.
Figure 6:
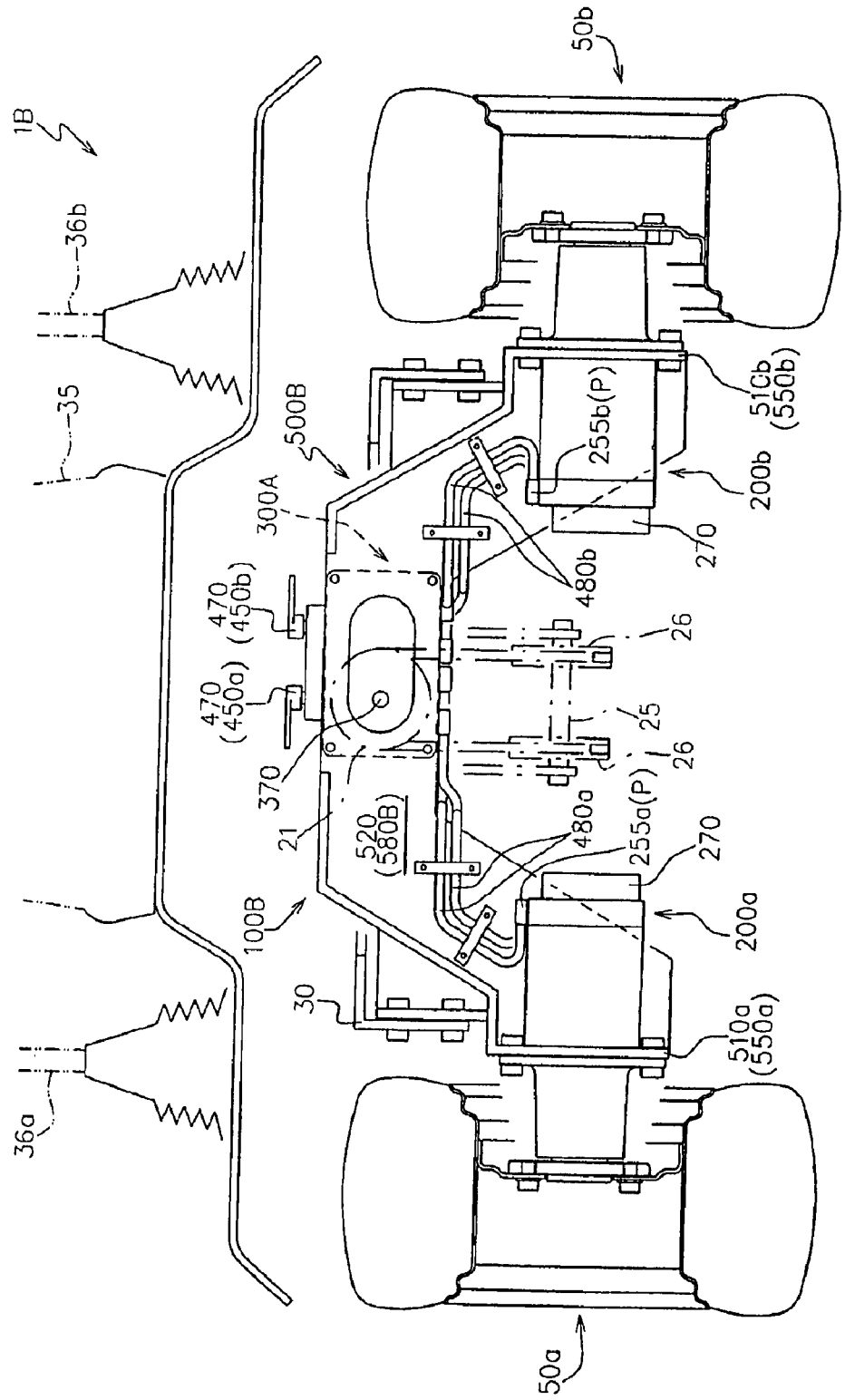
FIG. 6 is a partial rear view of the working vehicle shown in FIG. 5.

FIG. 5 and FIG. 6 are a side view and a partial rear view, respectively, of a working vehicle 1B to which the HST unit 100B according to the present embodiment is applied.

In the figure, the same reference characters are denoted for the members same as those in the first embodiment, and thus the explanation thereof is omitted.

The HST unit 100B according to the present embodiment is configured so as to be applied to the working vehicle 1B including a horizontal crank shaft type driving power source 40B.

Specifically, the working vehicle 1B includes the vehicle frame 30, a driving power source 40B supported by the vehicle frame 30, the HST unit 100B according to the present embodiment, a traveling system power transmission mechanism 10B for transmitting the power from the driving power source 40B to the HST unit 100B, the first driving wheel 50*a* and the second driving wheel 50*b*, the caster wheels 60, the working machine 70, and a PTO system power transmission mechanism 20B for transmitting the power from the driving power source 40B to the working machine 70.

The driving power source 40B is supported by the vehicle frame 30 so that the driving shaft 41 extends towards the front in the horizontal direction.

Preferably, as shown in FIG. 5, the driving power source 40B is supported by the vehicle frame 30 by way of four rubber vibration isolators 47 arranged at the front and the back and at the left and the right, whereby the transmitting of the vibration from the driving power source 40B to the vehicle frame 30 is prevented as much as possible.

The HST unit 100B includes an attachment frame 500B in place of the attachment frame 500A in the HST unit 100A according to the first embodiment.

Specifically, the HST unit 100B includes the first hydraulic motor unit 200*a*, the second hydraulic motor unit 200*b*, the hydraulic pump unit 300A, and an attachment frame 500B for supporting the hydraulic pump unit 300A, the first hydraulic motor unit 200*a* and the second hydraulic motor unit 200*b* so as to define a free space between the first and second driving wheels 50*a*, 50*b*.

The attachment frame 500B supports the hydraulic pump unit 300A so that the input shaft 370 lies along the horizontal direction in a state attached to the vehicle frame 30.

Specifically, the attachment frame 500B includes the first side plate 550*a* configuring the first motor supporting surface 510*a*, the second side plate 550*b* configuring the second motor supporting surface 510*b*, and a connecting plate 580B extending substantially vertically along the vehicle width direction so as to connect the first and second side plates 550*a*, 550*b*, as shown in FIG. 6, wherein the connecting plate 580B configures the pump supporting surface 520.

In the present embodiment, the hydraulic pump unit 300A is supported by the front surface of the connecting plate 580B with the input shaft 370 extending rearwards through an opening formed in the connecting plate 580B.

The traveling system transmission mechanism 10B is configured so as to operatively connect the driving shaft 41 of the driving power source 40B and the input shaft 370 of the hydraulic pump unit 300A.

In the present embodiment, the traveling system transmission mechanism 10B is an universal joint 15 having a first end coupled to the driving shaft and a second end coupled to the input shaft.

The PTO system power transmission mechanism 20B is configured so as to transmit the power from another driving shaft 42 in the driving power source 40B to the working machine 70.

In other words, the PTO system power transmission mechanism 20B includes a working machine driving pulley 21 attached to the another driving shaft 42, a change-of-direction pulley 26 attached to an intermediate shaft 25 supported by the vehicle frame so as to lie in the vehicle width direction, a working machine driven pulley 22 attached to the input shaft of the working machine 70, and a working machine belt 23 wound around the working machine driving pulley 21, the change-of-direction pulley 26 and the working machine driven pulley 22.

As shown in FIG. 6, the connecting plate 580B preferably has a gate shape when seen from the front in a state where the attachment frame 500B is attached to the vehicle frame 30, so that the free space is provided as much as possible between the first and second driving wheels 50*a*, 50*b*.

The working machine belt 23 is arranged in the free space in the present embodiment.

The effects similar to the first embodiment are also obtained in the HST unit 100B.

Third Embodiment

The third embodiment of the HST unit according to the present invention will now be described with reference to the accompanied drawings.

Figure 7:
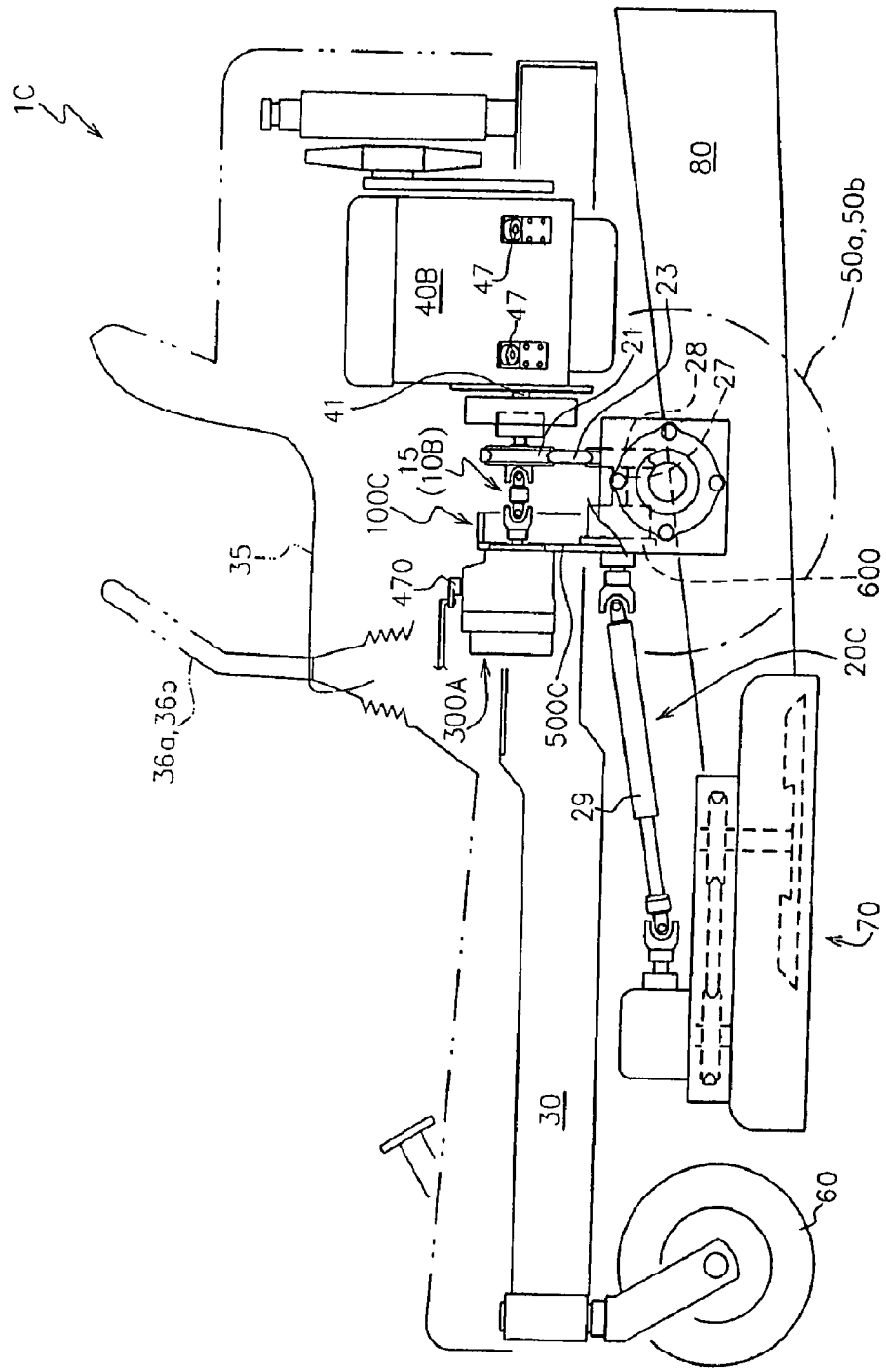
FIG. 7 is a side view of a working vehicle to which an HST unit according to a third embodiment of the present invention is applied.
Figure 8:
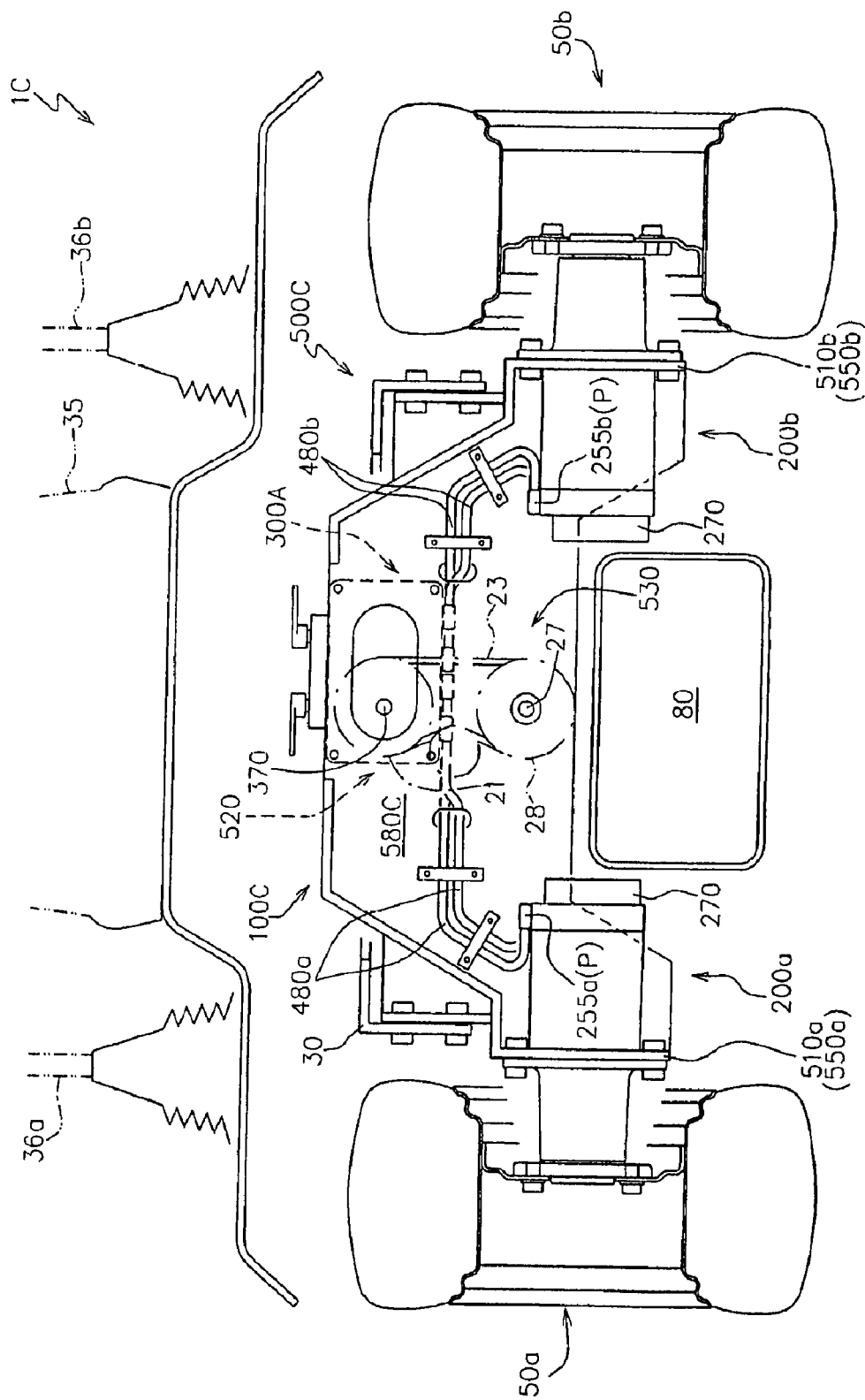
FIG. 8 is a partial rear view of the working vehicle shown in FIG. 7.

FIG. 7 and FIG. 8 are a side view and a partial rear view, respectively, of a working vehicle 1C to which the HST unit 100C according to the present embodiment is applied.

In the figure, the same reference characters are denoted for the members same as those in the first and second embodiments, and thus the explanation thereof is omitted.

The HST unit 100C according to the present embodiment is configured so as to be applied to the working vehicle 1C including a horizontal crank shaft type driving power source 40B, similar to the second embodiment.

Specifically, the working vehicle 1C includes the vehicle frame 30, the driving power source 40*b* supported by the vehicle frame 30, the HST unit 100C according to the present embodiment, the traveling system power transmission mechanism 10B, the first driving wheel 50a and the second driving wheel 50b, the caster wheels 60, the working machine 70, a PTO system traveling power transmission mechanism 20C for transmitting power from the driving power source 40B to the working machine 70, and the duct 80.

The PTO system transmission mechanism 20C includes the working machine driving pulley 21 attached to the driving shaft 41, an intermediate shaft 27 arranged parallel to the driving shaft 41 and below the driving shaft 41, a working machine intermediate pulley 28 attached to the intermediate shaft 27, the working machine belt 23 wound around the working machine driving pulley 21 and the working machine intermediate pulley 28, a transmission shaft 29 with universal joints having one end coupled to the input shaft of the working machine 70, and a PTO clutch device 600 interposed between the intermediate shaft 27 and the transmission shaft 29, the PTO clutch device 600 selectively engaging or disengaging the power transmission from the intermediate shaft 27 to the transmission shaft 29.

The HST unit 100C includes an attachment frame 500C in place of the attachment frame 500B in the HST unit 100B according to the second embodiment.

Specifically, the HST unit 100C includes the first hydraulic motor unit 200a, the second hydraulic motor unit 200b, the hydraulic pump unit 300A, and an attachment frame 500C for supporting the hydraulic pump unit 300A, the first hydraulic motor unit 200a and the second hydraulic motor unit 200b so as to define a free space between the first and second driving wheels 50a, 50b.

The attachment frame 500C is configured so as to support the PTO clutch device 600 interposed in the PTO system transmission path from the driving power source 40B to the working machine 70, in addition to the first and second hydraulic motor units 200a, 200b and the hydraulic pump unit 300A.

In other words, the attachment frame 500C includes another supporting surface 530 integrally extending downward from the pump supporting surface 520 in a state attached to the vehicle frame 30, the another supporting surface 530 supporting the PTO clutch device 600.

Specifically, the attachment frame 500C includes the first side plate 550a configuring the first motor supporting surface 510a, the second side plate 550b configuring the second motor supporting surface 510b, and a connecting plate 580C extending substantially vertically along the vehicle width direction so as to connect the first and second side plates 550a, 550b.

The connecting plate 580C has the upper region forming the pump supporting surface 520, and the lower region forming the another supporting surface 530.

In the present embodiment, the hydraulic pump unit 300A is supported by the front surface of the connecting plate 580C, and the PTO clutch device 600 is supported by the rear surface of the connecting plate 580C.

As shown in FIG. 8, the connecting plate 580C is so configured to have a gate shape when seen from the front, whereby a free space is secured between the first and second driving wheels 50a, 50b.

The duct 80 is arranged in the free space in the present embodiment.

The effects similar to the first and second embodiments are also obtained in the HST unit 100C.

A hydraulic pump unit in which both the first and second hydraulic pump main bodies 310a, 310b are accommodated in a single pump case 330A has been explained by way of example in each of the above embodiment, but the present invention is not limited thereto.

In other words, a pair of first and second hydraulic pump units that are supported independently to each other by the attachment frame may be employed as the hydraulic pump unit.

In such embodiment, the first and second hydraulic pump units are fluidly connected to the first and second hydraulic motor units, respectively.

Fourth Embodiment

The fourth embodiment of the HST unit according to the present invention will now be described with reference to the accompanied drawings.

Figure 9:
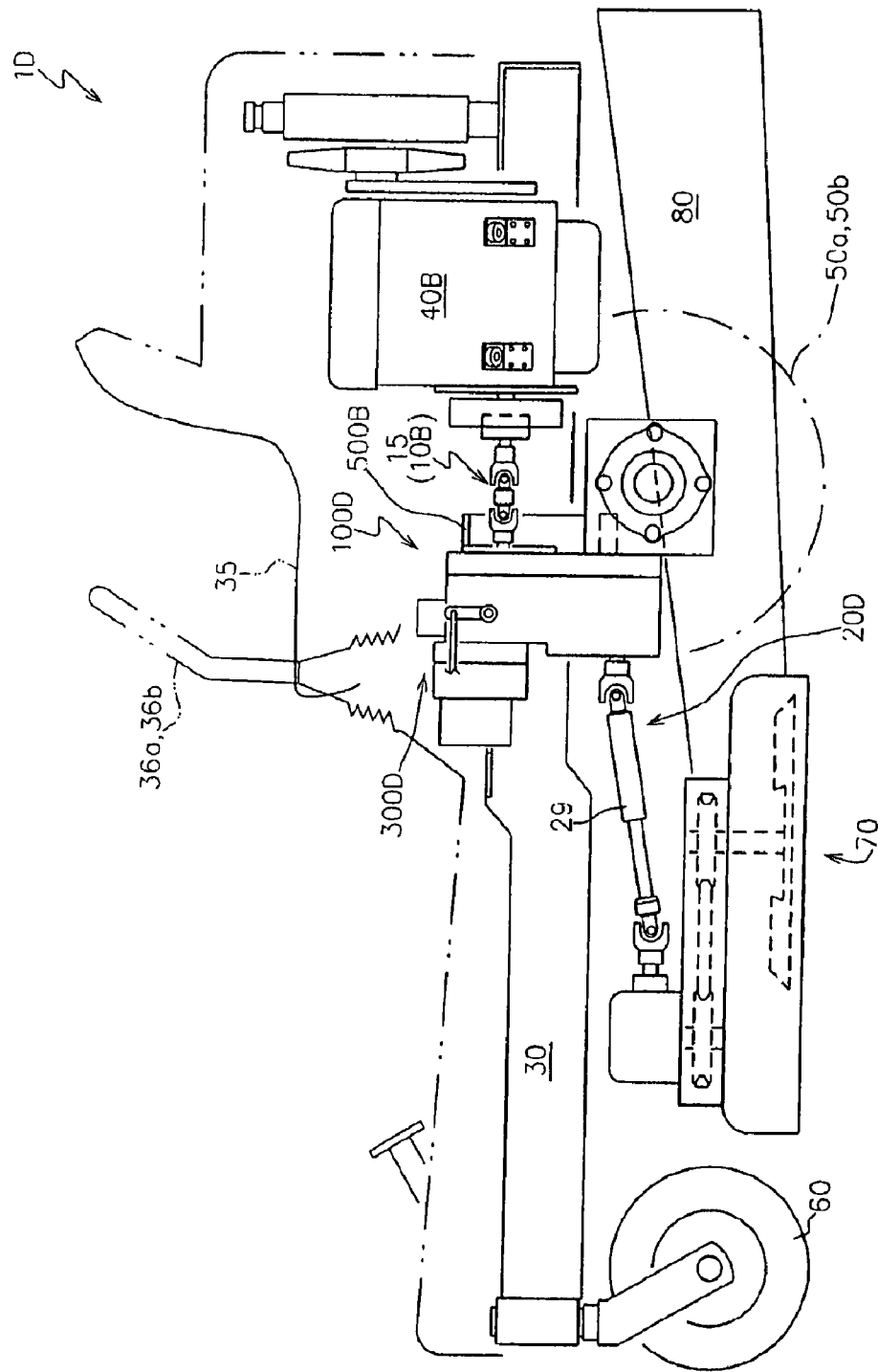
FIG. 9 is a side view of a working vehicle to which an HST unit according to a fourth embodiment of the present invention is applied.
Figure 10:
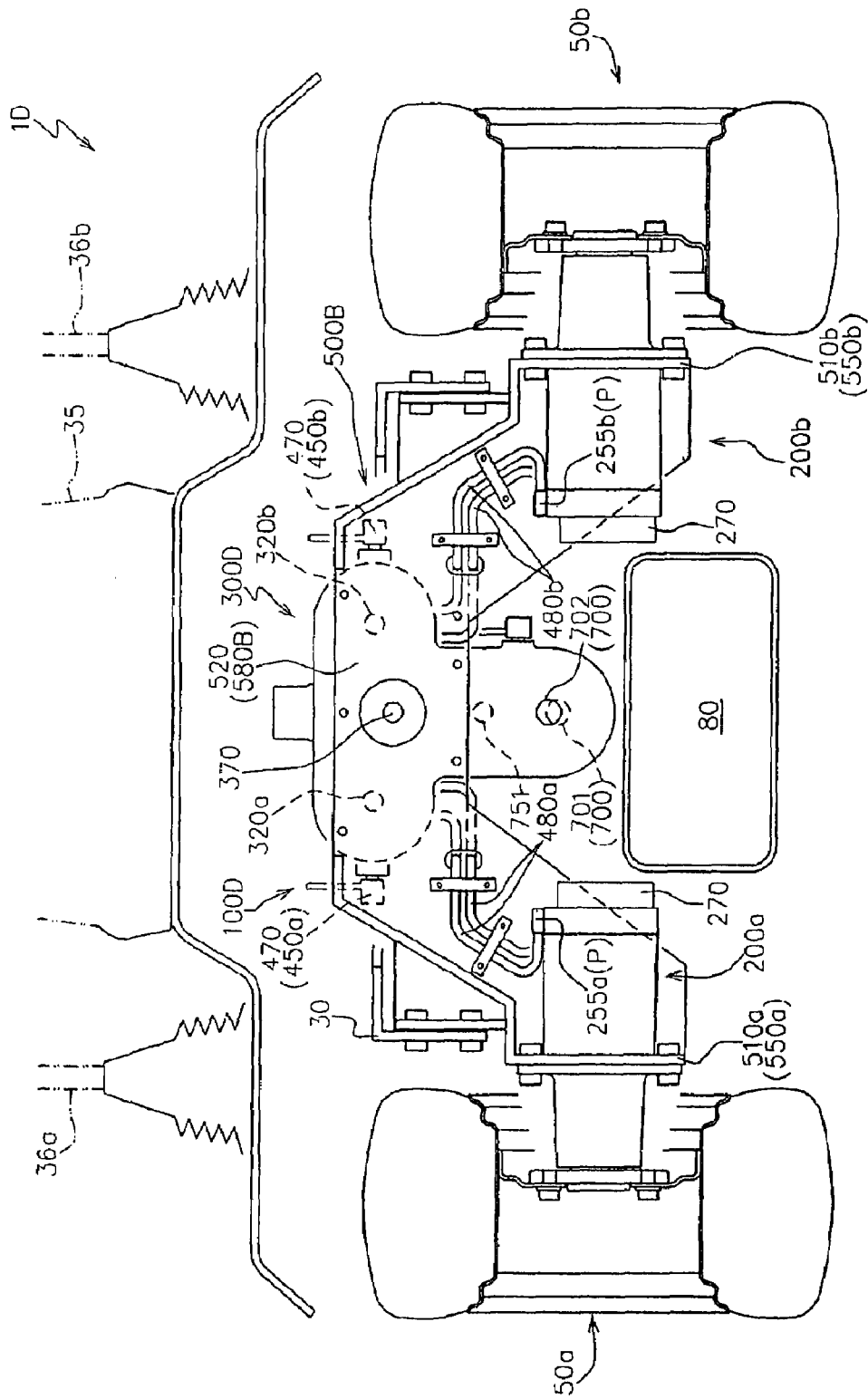
FIG. 10 is a partial rear view of the working vehicle shown in FIG. 9.

FIG. 9 and FIG. 10 are a side view and a partial rear view, respectively, of a working vehicle 1D to which the HST unit 100D according to the present embodiment is applied.

In the figure, the same reference characters are denoted for the members same as those in the first to the third embodiments, and thus the explanation thereof is omitted.

The HST unit 100D according to the present embodiment configures the traveling hydrostatic transmission of a working vehicle 1D including the horizontal crank shaft type driving power source 40B, and also configures a part of the PTO system transmission path from the driving power source 40B to the working machine 70.

Specifically, the working vehicle 1D includes the vehicle frame 30, the driving power source 40B supported by the vehicle frame 30, the HST unit 100D according to the present embodiment, the traveling system power transmission mechanism 10B for transmitting the power from the driving power source 40B to the HST unit 100D, the first driving wheel 50a and the second driving wheel 50b, the caster wheels 60, the working machine 70, a PTO system power transmission mechanism 20D for transmitting the power from the HST unit 100D to the working machine 70, and the duct 80.

The HST unit 100D includes the first hydraulic motor unit 200a, the second hydraulic motor unit 200b, a hydraulic pump unit 300D operatively connected to the driving power source 40B, the hydraulic pump unit 300D being fluidly connected to the first and second hydraulic motor units 200a, 200b and outputting the rotational power towards the working machine 70, and the attachment frame 500B.

Figure 11:
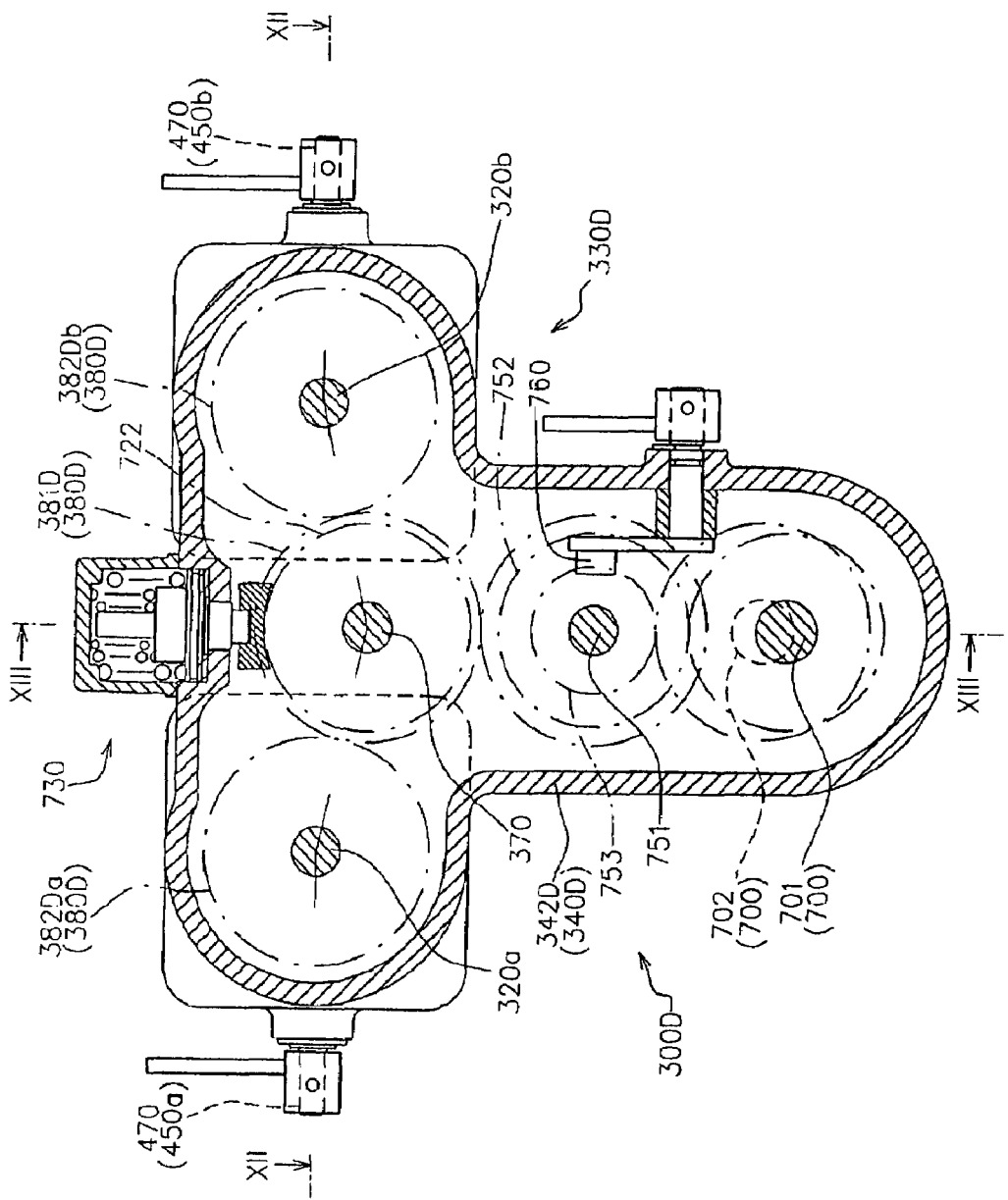
FIG. 11 is a vertical sectional rear view of a hydraulic pump unit in the HST unit according to the fourth embodiment.

FIG. 11 shows a vertical sectional rear view of the hydraulic pump unit 300D.

Figure 12:
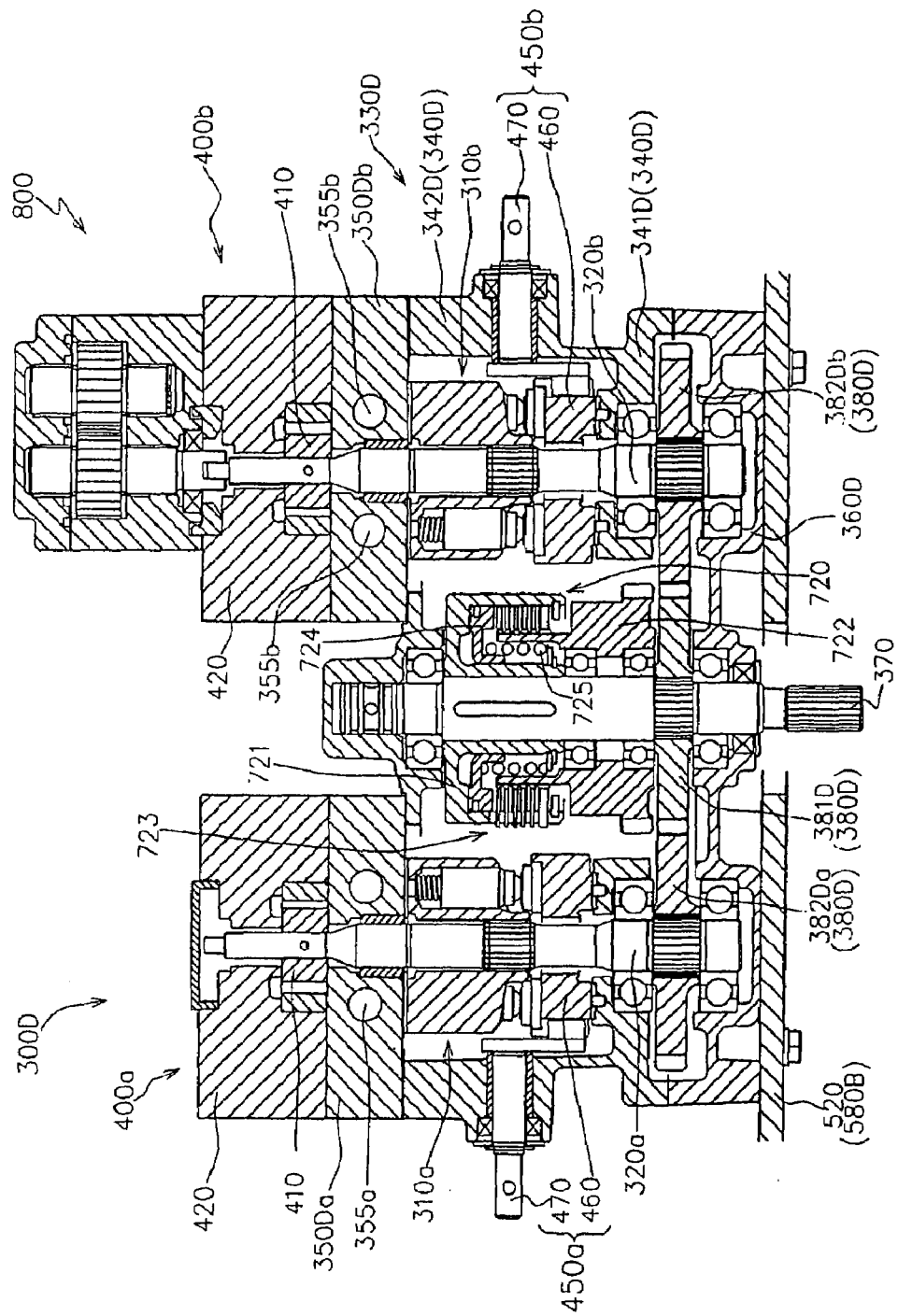
FIG. 12 is a cross sectional view taken along line XII-XII in FIG. 11.
Figure 13:
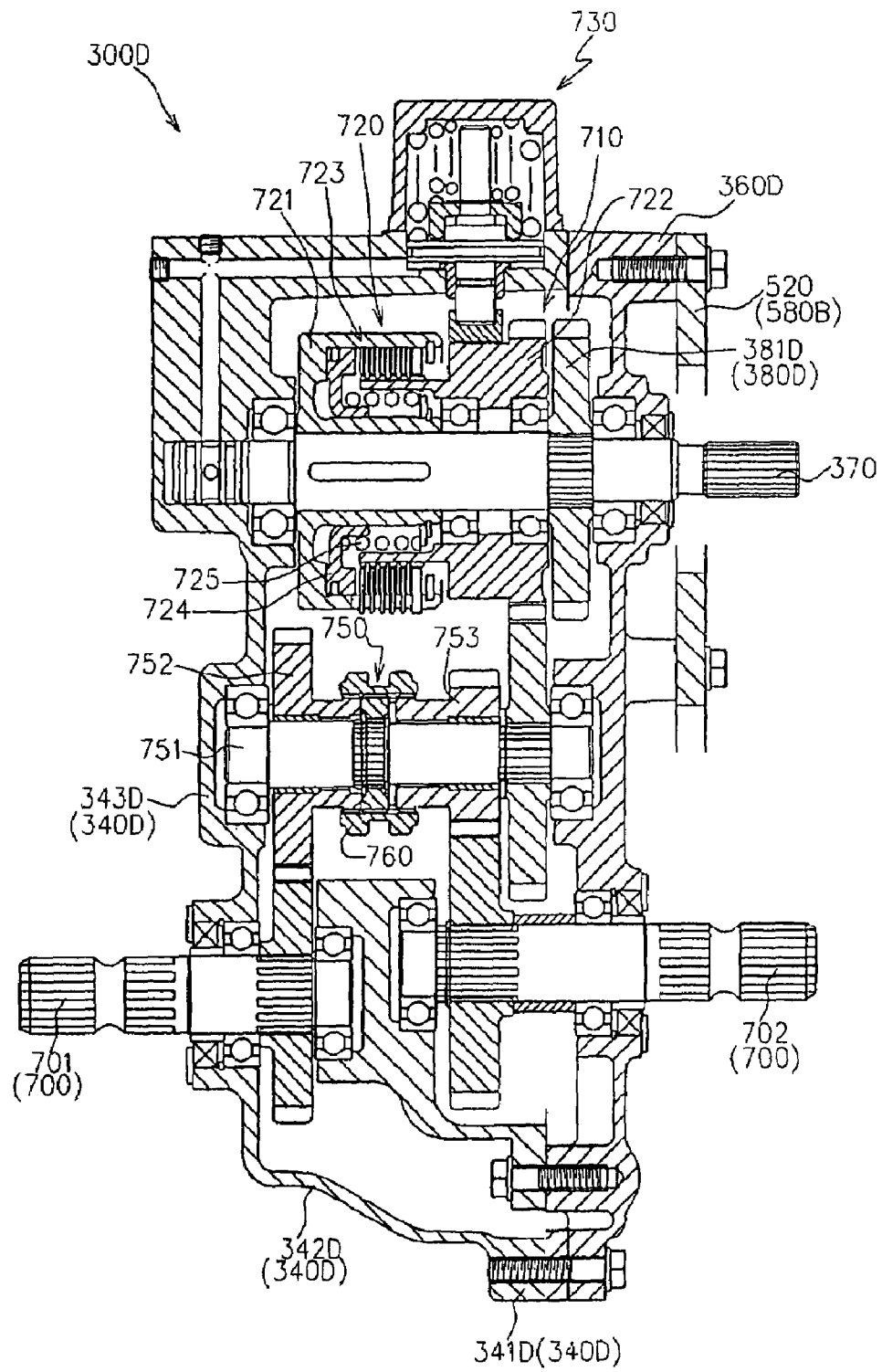
FIG. 13 is a cross sectional view taken along line XIII-XIII in FIG. 11.

FIG. 12 and FIG. 13 show cross sectional views taken along line XII-XII and line XIII-XIII, respectively, in FIG. 11.

As shown in FIG. 11 to FIG. 13, the hydraulic pump unit 300D includes the input shaft 370 operatively connected to the driving power source 40B, the first and second pump shafts 320a, 320b, a traveling transmission mechanism 380D for transmitting the power from the input shaft 370 to the first and second pump shafts 320a, 320b, the first and second hydraulic pump main bodies 310a, 310b supported in a relatively non-rotatable manner at the first and second pump shafts 320a, 320b, respectively, a PTO shaft 700 for externally outputting the rotational power, a PTO transmission mechanism 710 for transmitting the power from the input shaft 370 to the PTO shaft 700, and a pump case 330D for accommodating the first and second hydraulic pump main bodies 310a, 310b and for supporting the input shaft 370, the first pump shaft 320a, the second pump shaft 320b and the PTO shaft 700 in a rotatable manner about the respective axis line.

Similar to the first embodiment, the hydraulic pump unit 300D is of a variable displacement type in the present embodiment.

Therefore, the hydraulic pump unit 300D includes first and second capacity adjusting mechanisms 450a, 450b, in addition to the above configuration.

The first and second capacity adjusting mechanisms 450a, 450b include output adjusting members 460 such as movable swash plates for changing the supply/suction amount of the corresponding hydraulic pump main body, and control shafts 470 for tilting the output adjusting member 460 based on external operation, as shown in FIG. 12.

As shown in FIG. 12 and FIG. 13, the pump case 330D includes a pump case main body 340D, first and second pump-side port blocks 350Da, 350Db detachably coupled to the pump case main body 340D, and a lid member 360D detachably coupled to the pump case main body 340D.

The pump case main body 340D has a first end wall 341D extending in a direction orthogonal to the axis line of the pump shafts 320a, 320b, a second end wall 343D spaced apart from the first end wall 341D in the axis line direction of the pump shafts 320a, 320b, the second end wall 343D extending in a direction orthogonal to the axis line of the pump shafts 320a, 320b, and a peripheral wall 342D for connecting the peripheral edges of the first end wall 341D and the second end wall 343D.

First and second openings through which the first and second hydraulic pump main bodies 310a, 310b are inserted, respectively, are formed in the second end wall 343D.

Each control shaft 470 of the first and second capacity adjusting mechanism 450a, 450b is supported by the peripheral wall 342D in a rotatable manner about the respective axis line in a state of being operable from outsides.

The first and second pump-side port blocks 350Da, 350Db are detachably coupled to the pump case main body 340D so as to close the first and second openings, respectively.

A pair of first hydraulic pump-side operational fluid passages 355a are formed in the first pump-side port block 350Da.

Similarly, a pair of second hydraulic pump-side operational fluid passages 355b are formed in the second pump-side port block 350Db.

The pair of first and second pump-side port blocks 350Da, 350Db are provided in the present embodiment, as mentioned above, but a single pump-side port block may obviously be provided.

The lid member 360D is coupled to the pump case main body 340D so as to define a transmission mechanism accommodating space for accommodating the transmission mechanism 380D in cooperation with the first end wall 341D.

The input shaft 370 is supported by the pump case 330D so that one end forming the input end extends outward.

In the present embodiment, the input shaft 370 is supported by the lid member 360D and the second end wall 343D, and one end forming the input end is extended outward from the lid member 360D.

The first and second pump shafts 320a, 320b are supported by the lid member 360D, the first end wall 341D and the corresponding pump-side port blocks 350Da, 350Db so as to support the corresponding hydraulic pump main bodies 310a, 310b in the pump accommodating space.

The traveling transmission mechanism 380D is configured to transmit the power from the input shaft 370 to the first and second pump shafts 320a, 320b within the pump case 330D.

In the present embodiment, the traveling transmission mechanism 380D includes a driving gear 381D supported in a relatively non-rotatable manner at the input shaft 370, and first and second driven gears 382Da, 382Db supported in a relatively non-rotatable manner at the first and second pump shafts 320a, 320b, respectively, so as to be engaged with the driving gear 381D.

In the present embodiment, the PTO shaft 700 includes a first PTO shaft 701 for outputting the rotational power towards the front side from the pump case 330D, and a second PTO shaft 702 for outputting the rotational power towards the rear side from the pump case 330D.

The first PTO shaft 701 is operatively connected to the input shaft of the working machine 70 by way of the PTO system power transmission mechanism 20D (transmission shaft 29 with universal joints in the present embodiment).

The second PTO shaft 702 is operatively connected to another working machine (not shown) arranged at the rear of the vehicle frame by way of an appropriate transmission mechanism.

The PTO transmission mechanism 710 is configured so as to transmit the power from the input shaft 370 to the first and second PTO shafts 701, 702 within the pump case 330D.

In the present embodiment, the PTO transmission mechanism 710 is configured so as to selectively engage or disengage the power transmission from the input shaft 370 to the first and second PTO shafts 701, 702.

Specifically, the PTO transmission mechanism 710 includes a PTO hydraulic clutch device 720, as shown in FIG. 12 and FIG. 13.

The PTO hydraulic clutch device 720 includes a driving-side member 721 operatively connected to the input shaft 370 and a driven-side member 722 operatively connected to the first and second PTO shafts 701, 702, and is configured so as to selectively engage or disengage the power transmission from the driving-side member 721 to the driven-side member 722 by the act of hydraulic pressure.

For example, the hydraulic pressure from the first charge pump unit 400a to be hereinafter described may be used as the operational fluid for the PTO hydraulic clutch device 720.

In the present embodiment, the PTO hydraulic clutch device 720 includes a driving-side member 721 supported in a relatively non-rotatable manner at the input shaft 370, a driven-side member 722 supported in a relatively non-rotatable manner at the input shaft 370, a friction plate group 723 including driving side friction plates supported in a relatively non-rotatable manner at the driving-side member 721 and driven side friction plates supported in a relatively non-rotatable manner at the driven-side member 722, and a piston member 724 for switching the friction engagement of the friction plate group 723 by the act of the hydraulic pressure, as shown in FIG. 12 and FIG. 13.

In the present embodiment, the PTO hydraulic clutch device 720 is of a hydraulic pressure operating type in which the friction plate group 723 is frictionally engaged when the operational fluid is being supplied.

Reference character 725 in the figure denotes a spring member for biasing the piston member 724 in a direction away from the friction plate group 723, and is provided to prevent or reduce the friction produced at the friction plate group 723 when the operational fluid is not being supplied.

The PTO transmission mechanism 710 preferably includes a PTO brake device 730 that prevents the first and second PTO shafts 701, 702 from continuously rotating due to the force of inertia when the PTO hydraulic clutch device 720 disengages the power transmission.

In the present embodiment, the PTO brake device 730 is of a spring operation type that applies a braking force to the driven-side member 722 by a biasing force of the spring, and is configured to release the braking force by the operational fluid when the operational fluid is supplied to the PTO hydraulic clutch device 720.

Further, in the present embodiment, the PTO transmission mechanism 710 includes a PTO switching device 750 interposed between the PTO hydraulic PTO device 720 and the first and second PTO shafts 701, 702.

The PTO switching device 750 includes a counter shaft 751 operatively connected to the driven-side member 722 of the PTO hydraulic clutch device 720; a first counter gear 752 supported in a relatively rotatable manner at the counter shaft 751, the first counter gear 752 being operatively connected to the first PTO shaft 701; a second counter gear 753 supported in a relatively rotatable manner at the counter shaft 751, the second counter gear 753 being operatively connected to the second PTO shaft 702; and a shifting device 760 for transmitting the rotation of the counter shaft 751 to the first counter gear 751 and/or the second counter gear 753.

The PTO switching device 750 takes a state of outputting the rotational power only from the first PTO shaft 701, a state of outputting the rotational power only from the second PTO shaft 702, and a state of outputting the rotational power from both the first and second PTO shafts 701, 702, based on the operation of the shifting device 760.

As shown in FIG. 12, the hydraulic pump unit 300D further includes first and second charge pump units 400*a*, 400*b* rotationally driven by the first and second pump shafts 320*a*, 320*b*, respectively.

The first and second charge pump units 400*a*, 400*b* are each arranged to replenish the operational fluid to the corresponding hydraulic pump main bodies 310*a*, 310*b*.

In the present embodiment, the first charge pump unit 400*a* also supplies the operational fluid to the PTO hydraulic clutch device 720 and the PTO brake device 730.

The hydraulic pump unit 300D includes an auxiliary pump unit 800 rotationally driven by at least one of first or the second pump shaft 320*a*, 320*b* (second pump shaft 320*b* in the embodiment shown), as shown in FIG. 12.

For example, the auxiliary pump unit 800 is a high-pressure gear pump as shown in FIG. 12, and used as a hydraulic pressure source for lifting up and down the working machine.

The power transmission from the driving power source 40B to the working machine 70 is carried out through the PTO shaft 701 of the hydraulic pump unit 300D in the working vehicle 1D.

Therefore, the hydraulic pump unit 300D is supported by the attachment frame 500B so that the input shaft 370 is positioned in the pump supporting surface 520, and the first and second PTO shafts 701, 702 are positioned within the free space defined by the connecting plate 580B, when seen from the front.

The hydraulic pump unit in which both the first and second hydraulic pump main bodies 310*a*, 310*b* are accommodated in the single pump case 330D has been explained by way of example in the present embodiment, but the present invention is not limited thereto.

In other words, a pair of first and second hydraulic pump units that are supported independently to each other by the attachment frame may be provided as the hydraulic pump unit.

In such embodiment, the first and second hydraulic pump units are fluidly connected to the first and second hydraulic motor units, respectively, and the PTO shaft capable of outputting the rotational power from the input shaft is provided in at least one of the first or the second hydraulic pump unit.

Fifth Embodiment

The fifth embodiment of the HST unit according to the present invention will now be described with reference to the accompanying drawings.

Figure 14:
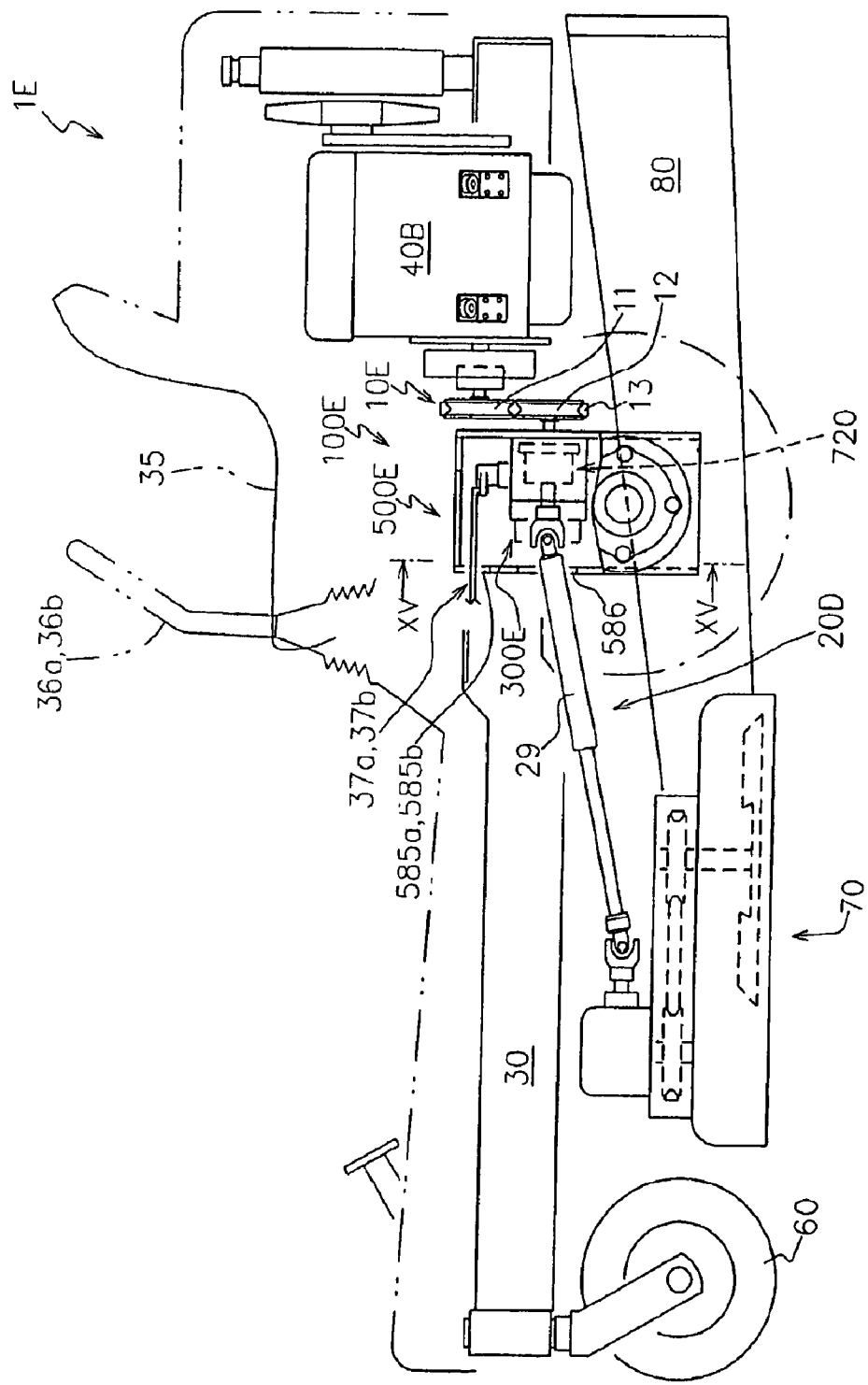
FIG. 14 is a side view of a working vehicle to which an HST unit according to a fifth embodiment of the present invention is applied.

FIG. 14 is a side view of a working vehicle 1E to which the HST unit 100E according to the present embodiment is applied.

Figure 15:
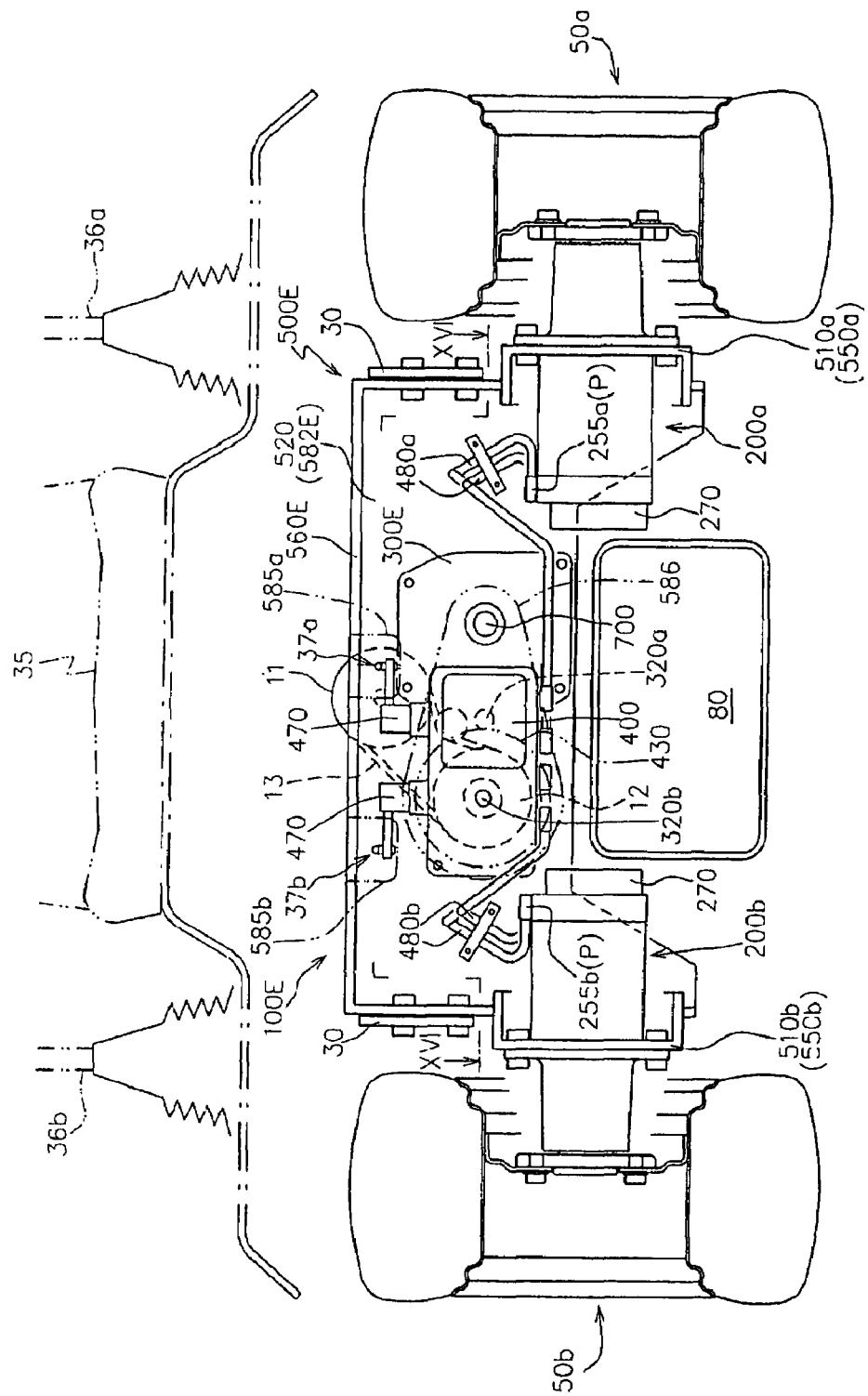
FIG. 15 is a cross sectional view taken along line XV-XV in FIG. 14.
Figure 16:
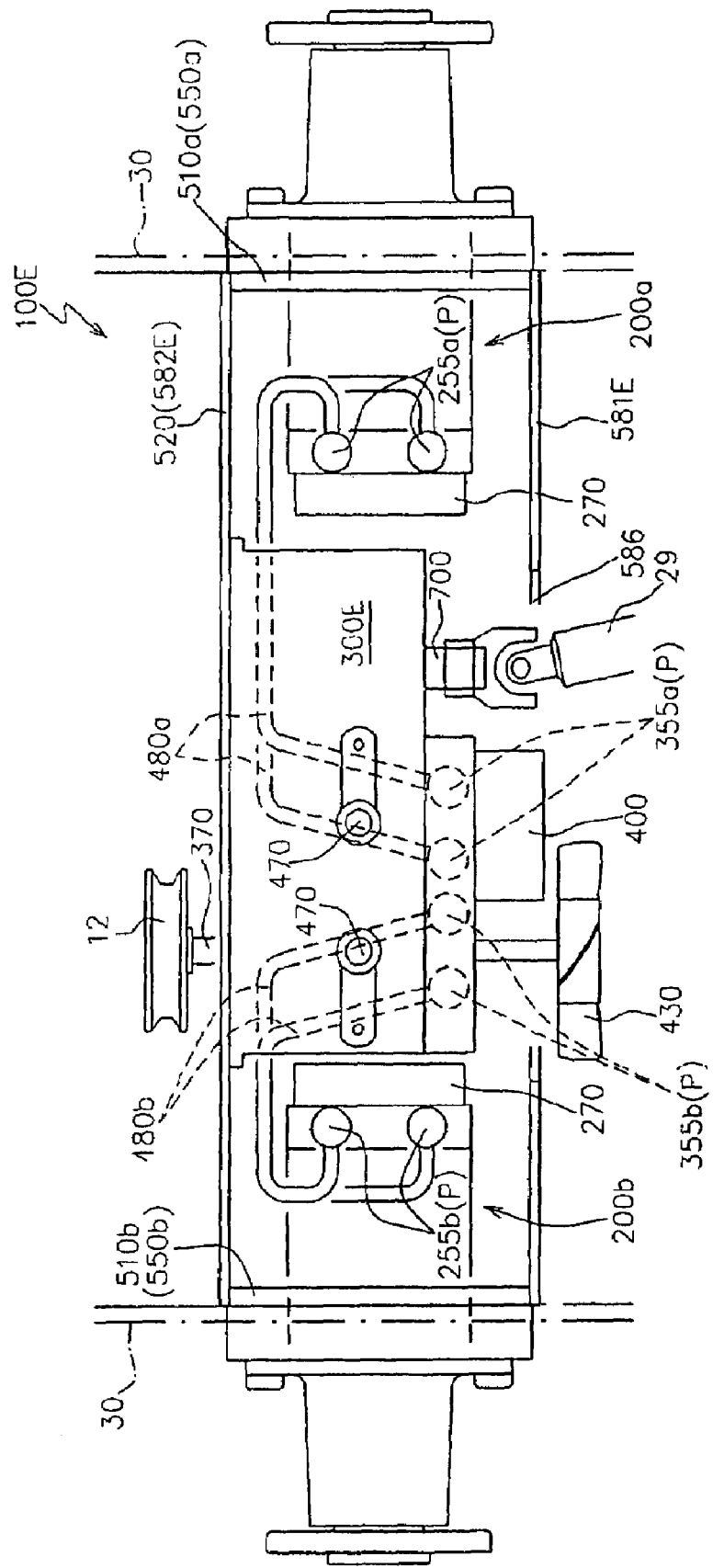
FIG. 16 is a cross sectional view taken along line XVI-XVI in FIG. 15.

FIG. 15 and FIG. 16 are a vertical sectional front view of the HST unit 100E taken along line XV-XV in FIG. 14 and a horizontal sectional plane view of the HST unit 100E taken along line XVI-XVI in FIG. 15.

In the figure, the same reference characters are denoted for the members same as those in the first to the fourth embodiments, and thus the explanation thereof is omitted.

The HST unit 100E according to the present embodiment configures the traveling hydrostatic transmission of a working vehicle 1E, and also configures a part of the PTO system transmission path from the driving power source 40B to the working machine 70, similar to the fourth embodiment.

Specifically, the working vehicle 1E includes the vehicle frame 30, the driving power source 40B supported by the vehicle frame 30, the HST unit 100E according to the present embodiment, a traveling system power transmission mechanism 10E for transmitting the power from the driving power source 40B to the HST unit 100E, the first driving wheel 50*a* and the second driving wheel 50*b*, the caster wheels 60, the working machine 70, the PTO system power transmission mechanism 20D for transmitting the power from the HST unit 100E to the working machine 70, and the duct 80.

The HST unit 100E includes the first hydraulic motor unit 200*a*; the second hydraulic motor unit 200*b*; a hydraulic pump unit 300E operatively connected to the driving power source 40B, the hydraulic pump unit 300E being fluidly connected to the first and second hydraulic motor units 200*a*, 200*b* and outputting the rotational power towards the working machine 70; and an attachment frame 500E attachable to the vehicle frame 30 in a state of supporting the first and second hydraulic motor units 200*a*, 200*b* and the hydraulic pump unit 300E.

The hydraulic pump unit 300E is configured to rotatably drive the first and second hydraulic pump main bodies 310*a*, 310*b* by the power from the driving power source 40B and to externally output the power from the driving power source 40B from the PTO shaft 700, similar to the hydraulic pump unit 300D in the fourth embodiment.

In other words, the hydraulic pump unit 300E includes the input shaft 370 operatively connected to the driving power source 40B, the first and second pump shafts 320*a*, 320*b*, a traveling transmission mechanism for transmitting the power from the input shaft 370 to the first and second pump shafts 320*a*, 320*b*, the first and second hydraulic pump main bodies supported in a relatively non-rotatable manner at the first and second pump shafts 320*a*, 320*b*, respectively, the PTO shaft 700 for externally outputting the rotational power, a PTO transmission mechanism for transmitting the power from the input shaft 370 to the PTO shaft 700, and a pump case for accommodating the first hydraulic pump main body, the second hydraulic pump main body, the traveling transmission mechanism and the PTO transmission mechanism, and for supporting the input shaft 370, the first pump shaft 320*a*, the second pump shaft 320*b*, and the PTO shaft 700 in a rotatable manner about respective axis line.

In the present embodiment, the hydraulic pump unit 300E further includes at least one charge pump unit 400 and at least one cooling fan 430.

The charge pump unit 400 is rotationally driven by the first or second pump shaft 320a, 320b.

Similarly, the cooling fan 430 is rotationally driven by the first or second pump shaft 320a, 320b.

In the illustrated embodiment, the charge pump unit 400 is rotationally driven by the first pump shaft 320a, and the cooling fan 430 is rotationally driven by the second pump shaft 320b.

The PTO transmission mechanism includes a PTO hydraulic clutch device 720 (see FIG. 14) for selectively engaging or disengaging the power transmission from the input shaft 370 to the PTO shaft 700, similar to the fourth embodiment.

The PTO transmission mechanism preferably includes the PTO brake device that prevents the PTO shaft 700 from continuously rotating due to the force of inertia when the PTO hydraulic clutch device disengages the power transmission, similar to the fourth embodiment.

The attachment frame 500E includes the first side plate 550a configuring the first motor supporting surface 510a, the second side plate 550b configuring the second motor supporting surface 510b, a first connecting plate 581E extending in the vehicle width direction lying substantially vertically so as to connect one side (front side) in the front and back direction of the vehicle of the first and second side plates 550a, 550b, a second connecting plate 582E extending in the vehicle width direction lying substantially vertically so as to connect the other side (back side) in the front and back direction of the vehicle of the first and second side plates 550a, 550b, and a top plate 560E lying substantially horizontally so as to connect the upper ends of the first and second side plates 550a, 550b as well as the first and second connecting plates 581E, 582E, as shown in FIG. 14 to FIG. 16.

The attachment frame 500E supports the hydraulic pump unit 300E within a space surrounded by the first side plate 550a, the second side plate 550b, the first connecting plate 581E, the second connecting plate 582E, and the top plate 560E.

In the present embodiment, the inner surface of the second connecting plate 582E facing the first connecting plate 581E is the pump supporting surface 520 for supporting the hydraulic pump unit 300E, as shown in FIG. 14 to FIG. 16.

Specifically, an opening through which the input shaft 370 is inserted is formed in the second connecting plate 582E.

The second connecting plate 582E supports the hydraulic pump unit 300E at the inner surface so that the input shaft 370 projects in the horizontal direction and outward in a direction approaching the driving power source 40B from the space through the opening.

As shown in FIG. 14 to FIG. 16, the openings 585a, 585b through which the link mechanisms 37a, 37b are inserted, respectively, and the opening 586 through which the transmission shaft 29 is inserted are formed in the first connecting plate 581E.

In the present embodiment, the input shaft 370 has the rotational axis line thereof directed in the front and back direction of the vehicle similar to the driving shaft 41 in the driving power source 40b, but the axis line of the input shaft 370 is off set in the vehicle width direction with respect to the driving shaft 41.

Therefore, the traveling system power transmission mechanism 10A is a pulley-belt transmission mechanism including the travel driving pulley 11, the travel driven pulley 12, and the travel belt 13.

Further, the hydraulic pump unit in which both the first and second hydraulic pump main bodies 310a, 310b are accommodated in the single pump case is given by way of example in the present embodiment, but the present invention is not limited thereto.

In other words, a pair of first and second hydraulic pump units that are supported independently to each other by the attachment frame may be provided as the hydraulic pump unit.

In such embodiment, the first and second hydraulic pump units are fluidly connected to the first and second hydraulic motor units, respectively, and the PTO shaft capable of outputting the rotational power from the input shaft is provided in at least one of the first or the second hydraulic pump unit.

In each embodiment, an example in which the first and second hydraulic pump main bodies 310a, 310b are independently fluidly connected to the first and second hydraulic motor main bodies 210a, 210b, respectively, is given by way of example, but the present invention is not limited thereto.

In other words, the first and second hydraulic motor main bodies 210a, 210b may be fluidly connected by a pair of motor-side conduits, and the pair of motor-side conduits and a single traveling hydraulic pump main body may be fluidly connected.

For instance, one of the first or the second hydraulic pump main body 310a, 310b in each embodiment may be used as the traveling hydraulic pump main body.

In this case, the other one of the first or the second hydraulic pump main body 310a, 310b may be omitted, or the other one of the first or the second hydraulic pump main body 310a, 310b may be used as a hydraulic pressure source for other hydraulic equipments.

Sixth Embodiment

The sixth embodiment of the HST unit according to the present invention will now be described with reference to the accompanied drawings.

Figure 17:
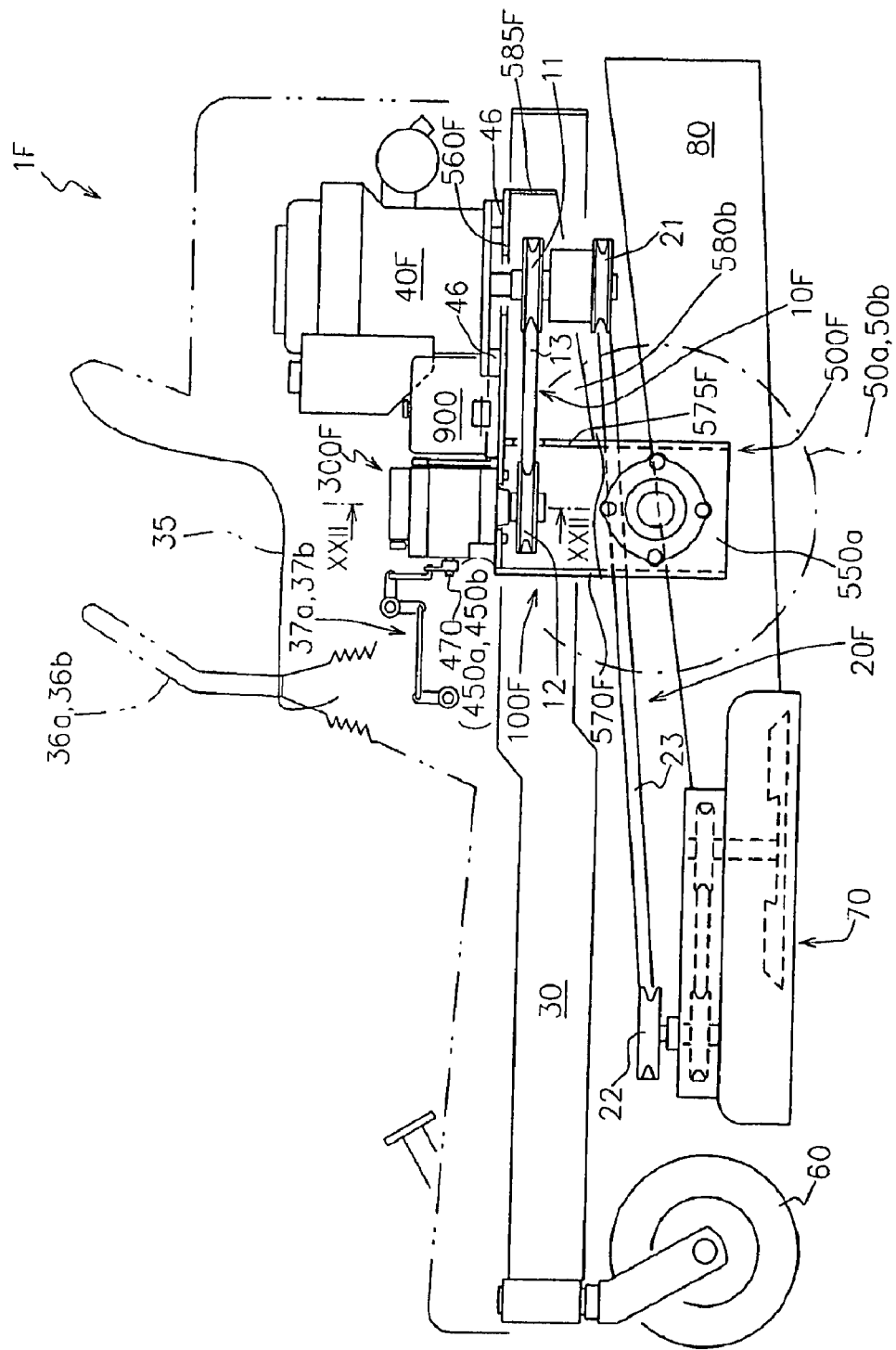
FIG. 17 is a side view of a working vehicle to which an HST unit according to a sixth embodiment of the present invention is applied.
Figure 18:
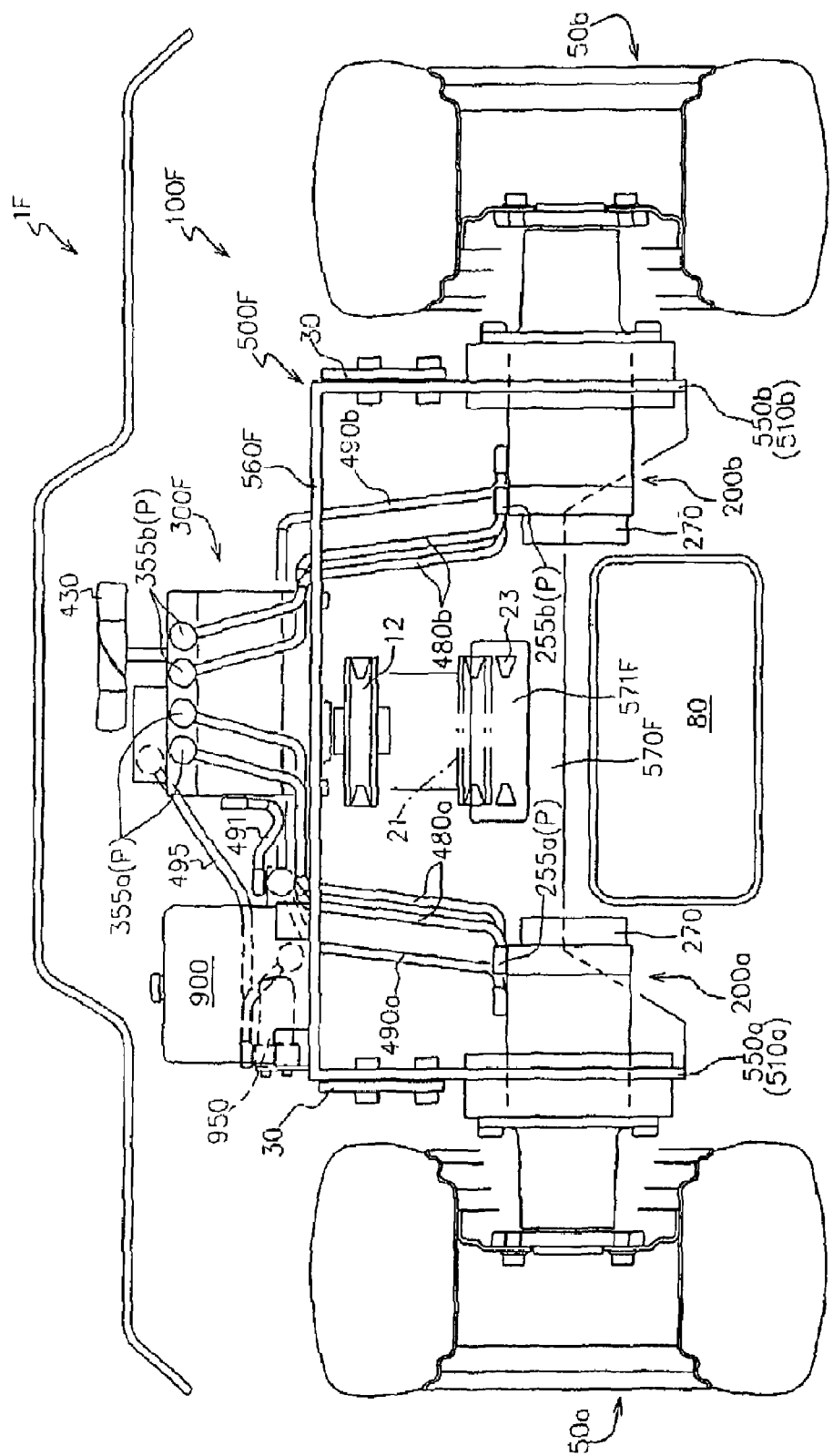
FIG. 18 is a partial rear view of the working vehicle shown in FIG. 17.
Figure 19:
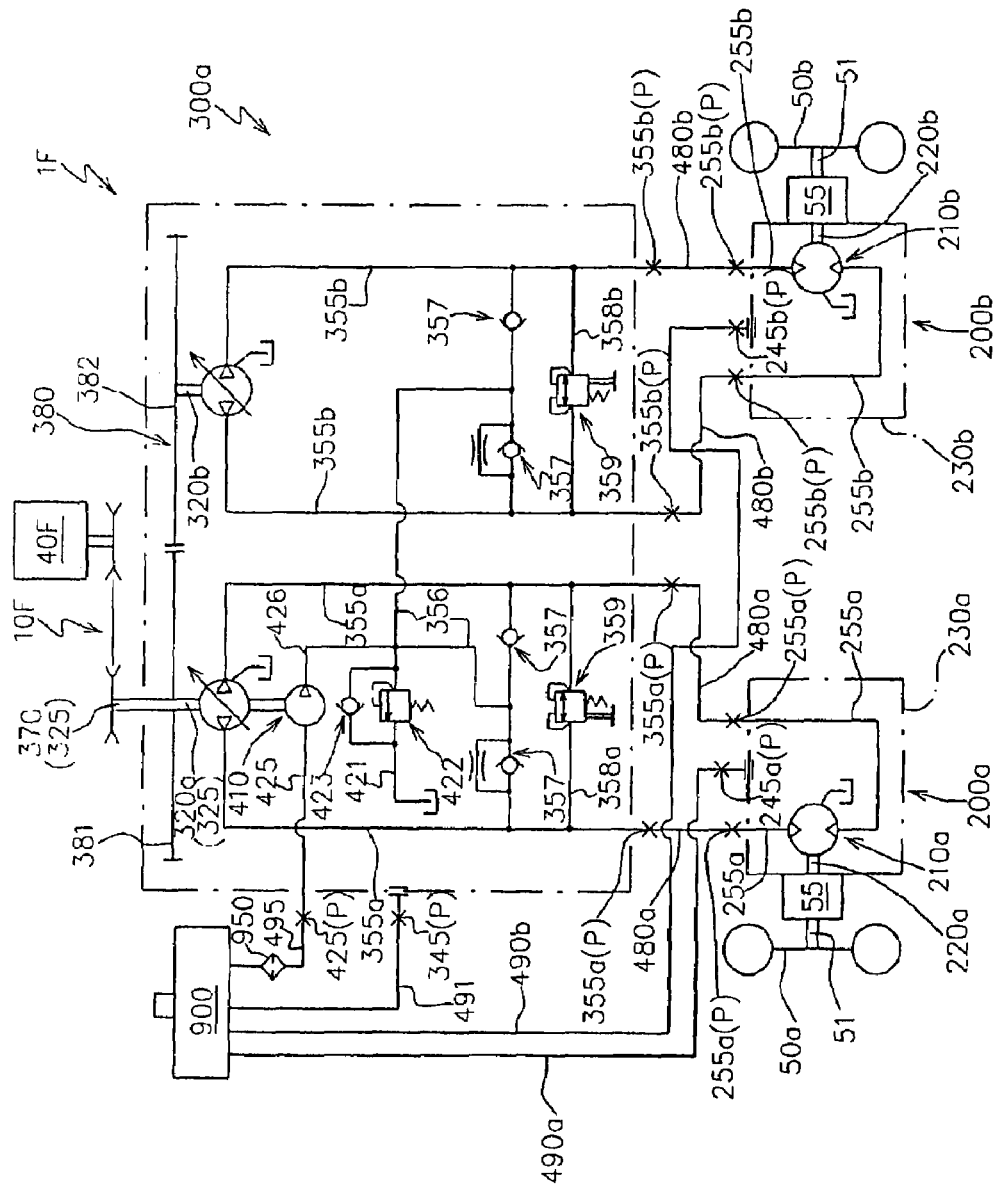
FIG. 19 is a hydraulic circuit diagram of the working vehicle shown in FIGS. 17 and 18.

FIGS. 17 to 19 are a side view, a partial rear view and a hydraulic circuit diagram, respectively, of a working vehicle 1F to which the HST unit 100F according to the present embodiment is applied.

As shown in FIGS. 17 to 19, the working vehicle 1F includes a vehicle frame 30, the HST unit 100F configuring the traveling hydrostatic transmission, a driving power source 40F of a vertical crank shaft type that act as a power source for the hydraulic pump unit 100F, a traveling system power transmission mechanism 10F for transmitting the power from the driving power source 40F to the HST unit 100F, the pair of first driving wheel 50a and second driving wheel 50b (rear wheels in the present embodiment), and the caster wheels 60 (front wheels in the present embodiment).

In the present embodiment, the working vehicle 1F is of a rear discharge type riding lawn mower.

That is, the working vehicle 1F further includes a driver's seat 35, a working machine 70 (mower device in the present embodiment) suspended and supported between the driving wheels 50 and the caster wheels 60 in a state of capable of lifting upwardly and downwardly, a PTO system power transmission mechanism 20F for transmitting the power from the driving power source 40A to the working machine 70, and a duct 80 for guiding the grass cut by the working machine 70 to a grass collecting bag (not shown) arranged at the back of the vehicle body.

The HST unit 100F is configured so as to form the traveling hydrostatic transmission while providing a free space between the pair of driving wheels 50a, 50b.

Specifically, as shown in FIGS. 17 and 18, the HST unit 100F includes; a first hydraulic motor unit 200a for operatively driving the first driving wheel 50a; a second hydraulic motor unit 200b for operatively driving the second driving wheel 50b; a hydraulic pump unit 300F operatively connected to the driving source 40F, the hydraulic pump unit 300F being fluidly connected to the first and second hydraulic motor units 200a, 200b; and an attachment frame 500F for supporting the driving power source 40F, the hydraulic pump unit 300F, the first hydraulic motor unit 200a and the second hydraulic motor unit 200b so as to define a free space between the first and second driving wheels 50a 50b.

At least one of the hydraulic pump unit 300F, and the first and second hydraulic motor units 200a, 200b is (are) of a variable displacement type.

In the present embodiment, the hydraulic pump unit 300F is of the variable displacement type, and the first and second hydraulic motor units 200a, 200b are of the fixed displacement type.

Figure 20:
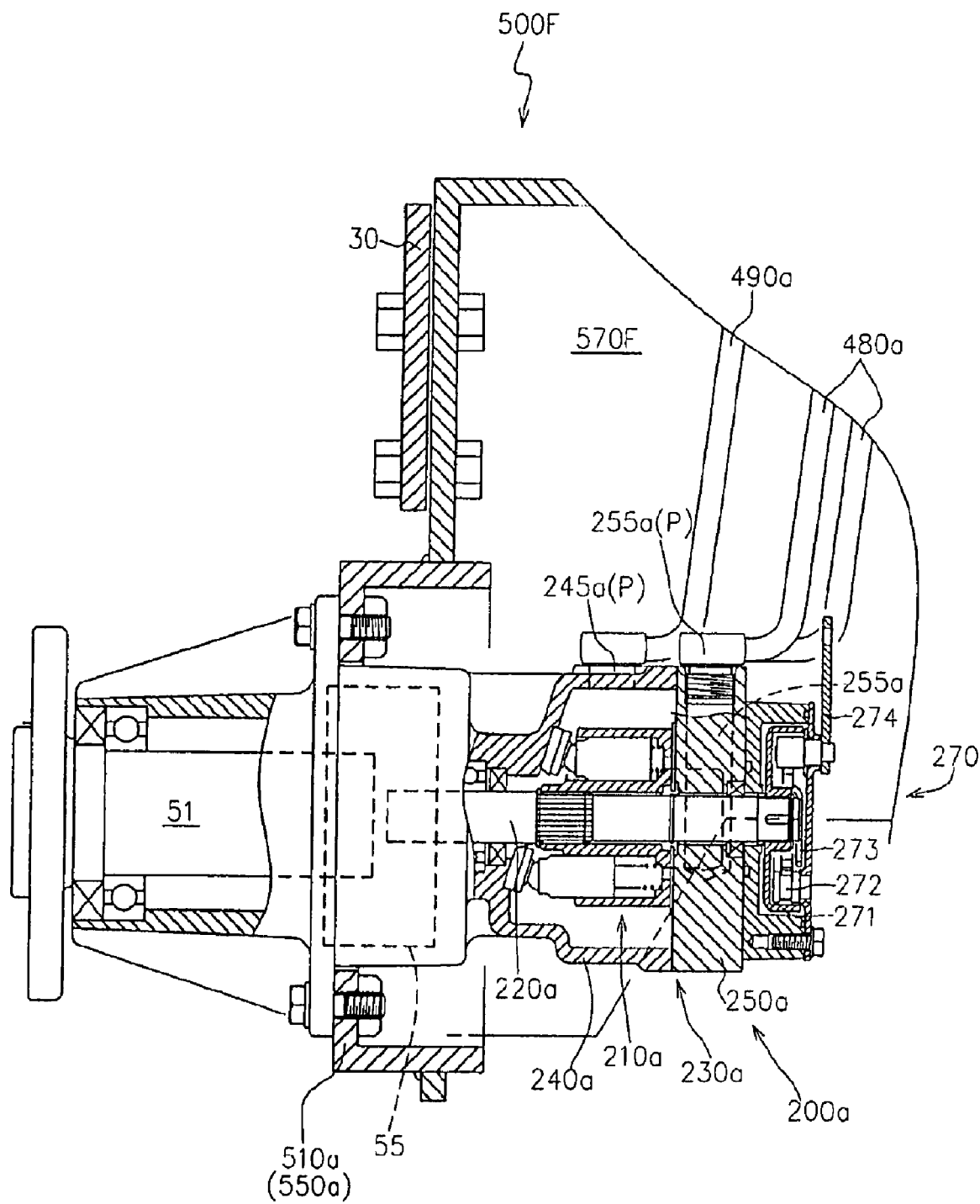
FIG. 20 is a vertical sectional rear view in the vicinity of a first hydraulic motor unit in the HST unit according to the sixth embodiment.

FIG. 20 shows a vertical sectional rear view in the vicinity of the first hydraulic motor unit 200a.

The second hydraulic motor unit 200b has substantially the same configuration as that of the first hydraulic motor unit 200a.

Therefore, the corresponding members of the second hydraulic motor unit 200b are designated by the same reference numerals or the same reference numerals with replacing subscript with b as those of the first hydraulic motor unit 200a, and thus the detailed description thereof is omitted.

As shown in FIG. 20, the first hydraulic motor unit 200a is configured so as to operatively drive the corresponding first driving wheel 50a.

Specifically, the first hydraulic motor unit 200a includes a first hydraulic motor main body 210a, a first motor shaft 220a rotationally driven about the axis line by the first hydraulic motor main body 210a, and a first motor case 230a for accommodating the first hydraulic motor main body 210a and for supporting the first motor shaft 220a in a rotatable manner about the axis line.

The first motor case 230a includes a motor case main body 240a having an opening, through which the first hydraulic motor main body 210a can be inserted, formed on the first end face (end face facing inward in the vehicle width direction in a state mounted to the vehicle frame 30 in the present embodiment), and a first motor-side port block 250a (first motor-side center section) coupled to the motor case main body 240a so as to close the opening.

As shown in FIGS. 19 and 20, the motor case main body 240a is provided with a first motor-side drain port 245a(P) for taking out the oil stored within the inner space of the first motor case 230a to the outsides.

The first motor-side port block 250a is provided with a pair of first hydraulic motor-side operational fluid passages 255a having first ends fluidly connected to the first hydraulic motor main body 210a and second ends opened to the outer surface.

The second ends of the pair of first hydraulic motor-side operational fluid passages 255a form first hydraulic motor-side operational fluid ports 255a(P) which act as fluid connecting ports to the first hydraulic pump main body 310a, to be hereinafter described.

The first motor shaft 220a has a first end operatively connected to a driving axle 51 for the first driving wheel 50a.

Preferably, the first motor shaft 220a is operatively connected to the corresponding driving axle 51 via a reduction transmission mechanism 55, as shown in FIGS. 19 and 20.

With the reduction transmission mechanism 55, capacity of the first hydraulic motor main body 210a could be made smaller.

In the present embodiment, the first hydraulic motor unit 200a has, in addition to the above configuration, a brake mechanism 270 that selectively applies a braking force to the first motor shaft 220a.

Specifically, the first motor shaft 220a has a second end (end opposite the first end operatively connected to the first driving wheel 50a) extending outward from the first motor-side port block 250a.

The brake mechanism 270 is configured so as to selectively apply the braking force to the second end of the first motor shaft 220 based on external operation.

The brake mechanism 270 is of an internal expanding type in the present embodiment.

Specifically, the brake mechanism 270 includes a brake drum 271 supported in a relatively non-rotatable manner at the second end of the first motor shaft 220a, a brake shoe 272 arranged facing the inner peripheral surface of the brake drum 271, a biasing member 273 for biasing the brake shoe 272 in a direction away from the inner peripheral surface of the brake drum 271, and a brake operation arm 274 for pushing the brake shoe 272 toward the inner peripheral surface of the brake drum 271 against the biasing force of the biasing member 273.

Although the inner expanding brake device is adopted as the brake mechanism 270 in the present embodiment, other brake devices such as a disc brake device could obviously be used.

Figure 21:
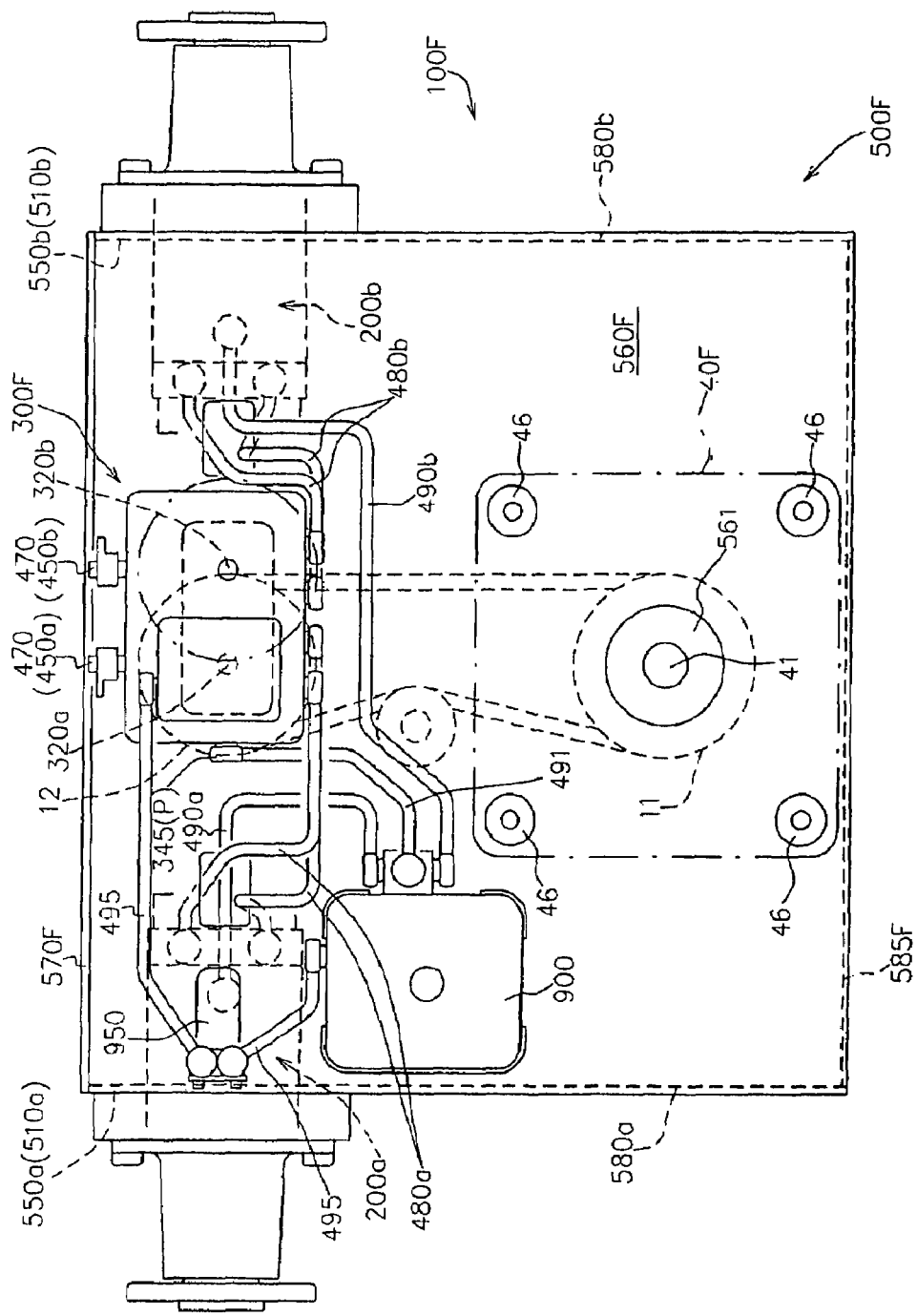
FIG. 21 is a plane view of the HST unit according to the sixth embodiment.
Figure 22:
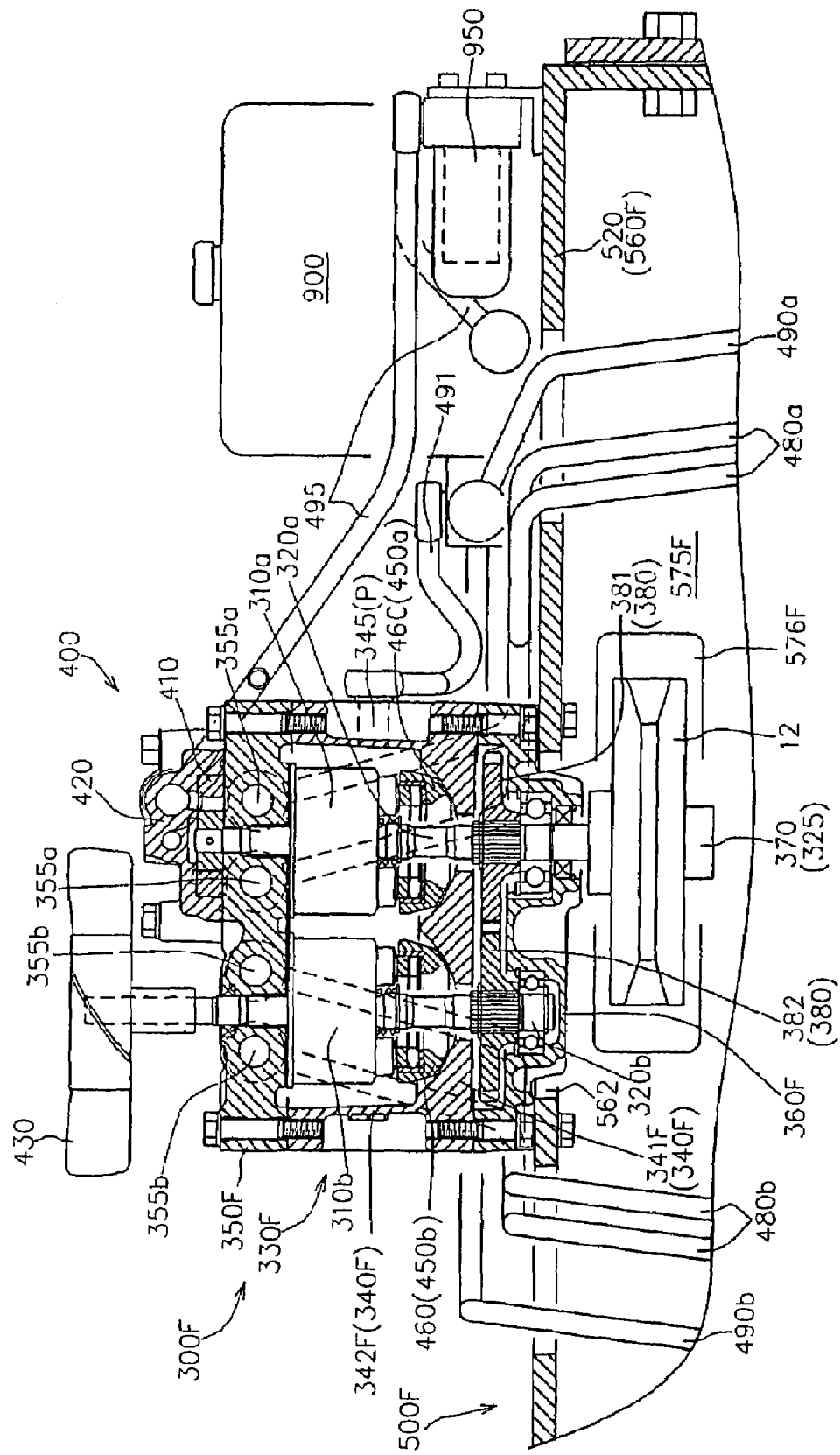
FIG. 22 is a cross sectional view taken along line XXII-XXII in FIG. 17.

FIG. 21 shows a plane view of the HST unit 100F, and FIG. 22 shows a vertical sectional front view of the hydraulic pump unit 300F taken along line XXII-XXII in FIG. 17.

As shown in FIGS. 21 and 22, in the present embodiment, the hydraulic pump unit 300F includes a first hydraulic pump main body 310a and a second hydraulic pump main body 310b that are fluidly connected to the first hydraulic motor main body 210a and the second hydraulic motor main body, respectively, and is so configured that the first and second hydraulic pump main bodies 310a, 310b are accommodated in a single pump case 330F.

Specifically, the hydraulic pump unit 300F includes an input shaft 370 operatively connected to the driving power source 40F, the first and second pump shafts 320a, 320b, a transmission mechanism 380 for transmitting the power from the input shaft 370 to the first and second pump shafts 320a, 320b, the first and second hydraulic pump main bodies 310a, 310b that are supported in a relatively non-rotatable manner at the first and second pump shafts 320a, 320b, respectively, and a pump case 330F for accommodating the first and second hydraulic pump main bodies 310a, 310b and for supporting the input shaft 370, and the first and second pump shafts 320a, 320b in a rotatable manner about the respective axis line.

In the present embodiment, the hydraulic pump unit 300F is of a variable displacement type, as mentioned above.

Therefore, the hydraulic pump unit includes first and second capacity adjusting mechanisms 450a, 450b for respectively changing the supply/suction amount of the first and second hydraulic pump main bodies 310a, 310b based on external operation, in addition to the above configuration.

The first and second capacity adjusting mechanisms 450a, 450b each includes an output adjusting member 460 (see FIG. 22) such as a movable swash plate for changing the supply/suction amount of the corresponding hydraulic pump main body 310, and a control shaft 470 (see FIGS. 17 and 21) for tilting the output adjusting member 460 based on external operation.

Each control shaft 470 of the first and second capacity adjusting mechanisms 450a, 450b is operatively connected to a pair of steering levers 36a, 36b, respectively, arranged at the front of the driver's seat 35 by way of appropriate link mechanisms 37a, 37b (see FIG. 17).

The pump case 330F includes a pump case main body 340F, a pump-side port block 350F (pump-side center section) detachably coupled to the pump case main body 340F, and a lid member 360F detachably coupled to the pump case main body 340F.

As shown in FIG. 22, the pump case main body 340F has an end wall 341F that extends in a direction substantially orthogonal to the axis line direction of the pump shafts 320a, 320b, and a peripheral wall 342F extending in the axis line direction of the pump shafts 320a, 320b from the peripheral edge of the end wall 341F.

The peripheral wall 342F has an opening at a free end side opposite the end wall 341F.

The opening is sized to allow the first and second hydraulic pump main bodies 310a, 310b to be inserted.

The pump-side port block 350F is coupled to the pump case main body 340F so as to close the opening.

In other words, a pump accommodating space for accommodating the first and second hydraulic pump main bodies 310a, 310b is defined by the end wall 341F and the peripheral wall 342F of the pump case main body 340F, and the pump-side port block 350F.

The pump case main body 340F is provided with a pump-side drain port 345(P) for taking out the oil stored within the pump accommodating space to the outsides.

As shown in FIGS. 19 and 22, the pump-side port block 350F is provided with a pair of first hydraulic pump-side operational fluid passages 355a having first ends fluidly connected to the first hydraulic pump main body 310a and second ends opened to the outer surface, and a pair of second hydraulic pump-side operational fluid passages 355b having first ends fluidly connected to the second hydraulic pump main body 310b and second ends opened to the outer surface.

The second ends of the pair of first hydraulic pump-side operational fluid passages 355a form first hydraulic pump-side operational fluid ports 355a(P) which act as the fluid connecting ports to the first hydraulic motor main body 210a (see FIGS. 18 and 19).

The second ends of the pair of second hydraulic pump-side operational fluid passages 355b form second hydraulic pump-side operational fluid ports 355b(P) which act as the fluid connecting ports to the second hydraulic motor main body (see FIGS. 18 and 19).

As shown in FIG. 19, the pump-side port block 350F is further provided with a charge passage 356 having a first end opened to the outer surface so as to form a charge port (not shown) and second ends fluidly connected to each of the pair of first hydraulic pump-side operational fluid passages 355a and each of the pair of second hydraulic pump-side operational fluid passages 355b via check valves 357, respectively.

Furthermore, the pump-side port block 350F is provided with a first bypass passage 358a communicating between the pair of first hydraulic pump-side operational fluid passages 355a, and a second bypass passage 358b communicating between the pair of second hydraulic pump-side operational fluid passages 355b (see FIG. 19).

In each of the first and second bypass passages 358a, 358b, a bypass valve with relief function 359 is interposed.

The lid member 360FA is coupled to the pump case main body 340F so as to define a transmission mechanism accommodating space for accommodating the transmission mechanism 380 in cooperation with the end wall 341F.

The input shaft 370 is supported by the pump case 330F so that one end forming the input end extends outward.

The first and second pump shafts 320a, 320b are supported at the both ends by the lid member 360F and the pump-side port block 350F so as to support the corresponding hydraulic pump main bodies 310a, 310b within the pump accommodating space.

The transmission mechanism 380 is configured to transmit the power from the input shaft 370 to the first and second pump shafts 320a, 320b.

In the present embodiment, the first pump shaft 320a and the input shaft 370 are integrally formed by a single shaft 325, as shown in FIGS. 18 and 22.

Therefore, the transmission mechanism 380 includes a driving gear 381 supported in a relatively non-rotatable manner at the single shaft 325, and a driven gear 382 supported in a relatively non-rotatable manner at the second pump shaft 320b so as to engage with the driving gear 381.

Preferably, one of or both of the first and second pump shafts 320a, 320b has (have) at least one end extending outward from the pump case 330F.

The projecting end is used as the driving shaft for the charge pump main body annexed to the hydraulic pump unit 300a or other rotating members, as desired.

In the present embodiment, the input shaft 370 and the first pump shaft 320a are integrally formed by the single shaft 325, as explained above.

As shown in FIG. 22, the single shaft 325 has a first end passing through the lid member 360F and projecting outward to form the input end, and a second end passing through the pump-side port block 350F and extending outward.

The second end of the single shaft 325 acts as the driving shaft for a charge pump main body 410 that is to be hereinafter described.

In the present embodiment, the second pump shaft 320b also has a second end passing through the pump-side port block 350F and extending outward, at which a cooling fun 430 is supported in a relatively non-rotatable manner, as shown in FIG. 22.

In the present embodiment, the hydraulic pump unit 300F includes a charge pump unit 400, in addition to the above configuration.

The charge pump unit includes a charge pump main body 410 operatively driven by the rotational power of the input shaft 370, and a charge pump case 420 surrounding the charge pump main body 410, as shown in FIG. 22.

In the present embodiment, the charge pump main body 410 is configured so as to be driven by the second end of the single shaft 325.

The charge pump case 420 is coupled to the pump-side port block 350F so as to surround the charge pump main body 410.

As shown in FIG. 19, the charge pump case 420 is provided with a suction passage 425 having a first end opened to the outer surface so as to form a suction port 425(P) and a second end fluidly connected to a suction side of the charge pump main body 410, and a discharge passage 426 having a first end fluidly connected to a discharge side of the charge pump main body 410 and a second end opened to a contact surface with the pump-side port block 350F so as to be fluidly connected to the charge passage 356.

Furthermore, the charge pump case 420 or the pump-side port block 350F is provided with a charge pressure setting passage 421 having a first end fluidly connected to the charge passage 356 and a second end fluidly connected to an oil tank (the pump accommodating space in the present embodiment), a relief valve 422 interposed in the charge pressure setting passage 421, and a check valve for self-suction 423 interposed in the charge pressure setting passage 421 in parallel with the relief valve 422.

The attachment frame 500F is so configured to support the driving power source 40F, the hydraulic pump unit 300F, the first hydraulic motor unit 200a and the second hydraulic motor unit 200b, and to be attachable to the vehicle frame 30 while providing a free space between the first and second driving wheels 50a, 50b.

Specifically, the attachment frame 500F integrally includes a first side plate 550a arranged on one side in the vehicle width direction so as to be positioned in the vicinity of the first driving wheel 50a, a second side plate 550b arranged on the other side in the vehicle width direction so as to be positioned in the vicinity of the second driving wheel 50b, and a top plate 560F extending in the vehicle width direction in a state of being substantially horizontally between the first and second side plates 550a, 550b, in a state attached to the vehicle frame 30, as shown in FIGS. 18 and 21.

The first side plate 550a extends substantially vertically so as to face the first driving wheel 50a, and form a first motor supporting surface 510a for supporting the first hydraulic motor unit 200a.

Similarly, the second side plate 550b extends substantially vertically so as to face the second driving wheel 50b, and form a second motor supporting surface 510b for supporting the second hydraulic motor unit 200b.

The top plate 560F is positioned above the first and second motor supporting surfaces 510a, 510b, and support the driving power source 40F and the hydraulic pump unit 300F so that the driving shaft 41 and the input shaft 370 extends substantially vertically.

Specifically, the top plate 560F is provided with an opening 561 through which the driving shaft 41 of the driving power source 40 can pass (see FIG. 21), and an opening 562 through which the input shaft 370 can pass.

The top plate 560F supports the driving power source 40F and the hydraulic pump unit 300F at its upper surface in a state where the end portions of the driving shaft 41 and the input end of the input shaft 370 are positioned below the top plate 560F through the openings 561, 562.

Preferably, the driving power source 40F is supported by the attachment frame 500F via elastic members 46. With the configuration, vibration from the driving power source 40F could be effectively prevented from transmitting to the vehicle frame 30 via the attachment frame 500F.

In order to simplify the connecting structure between the driving shaft 41 and the input shaft 370 that are extend substantially vertically, in the present embodiment, a pulley/belt mechanism is employed as the traveling system power transmission mechanism 10F.

Specifically, as shown in FIGS. 17, 18, 21 and 22, the traveling system power transmission mechanism 10F includes a travel driving pulley 11 attached to the driving shaft 41 of the driving power source 40F so as to be positioned below the top plate 560F, a travel driven pulley 12 attached to the input shaft 370 of the hydraulic pump unit 300F so as to be positioned below the top plate 560F, and a travel belt 13 wound around the travel driving pulley 11 and the travel driven pulley 12.

Similarly, the PTO system power transmission mechanism 20F is also a pulley/belt mechanism.

As shown in FIG. 17, the PTO system power transmission mechanism 20F includes a working machine driving pulley 21 attached to the driving shaft 41 of the driving power source 40F so as to be positioned below the top plate 560F, a working machine driven pulley 22 attached to the input shaft of the working machine 70, and a working machine belt 23 wound around the working machine driving pulley 21 and the working machine driven pulley 22.

In the HST unit 100F having the thus constructed attachment frame 500F, by attaching the hydraulic pump unit 300F, the first hydraulic motor unit 200a and the second hydraulic motor unit 200b that configures the traveling hydrostatic transmission, and the driving power source 40F that are the power source for the traveling hydrostatic transmission to the attachment frame 500F in advance, and then attaching the attachment frame 500F to the vehicle frame 30, it is possible to complete the attachment work of the driving power source 40F, the hydraulic pump unit 300F and the first and second hydraulic motor units 200a, 200b to the vehicle frame 30 while providing the free space between the first and second driving wheels 50a, 50b.

Therefore, the efficiency of the assembly work of the vehicle could be enhanced.

In this embodiment, as shown in FIGS. 17, 18 and the like, the attachment frame 500F integrally includes a first connecting plate 570F extending in the vehicle width direction in a state of lying substantially vertically so as to connect edges on one side (front edge in this embodiment) in the front and back direction of the vehicle of the first side plate 550a and the second side plate 550b, and a edge on one side in the front and back direction of the vehicle of the top plate 560F, a second connecting plate 575F extending in the vehicle width direction in a state of lying substantially vertically so as to connect edges on the other side (rear edge in this embodiment) in the front and back direction of the vehicle of the first side plate 550a and the second side plate 550b, and a lower surface of the top plate 560F, a first side extension plate 580a (see FIG. 21) extending from the edge on the other side of the first side plate 550a toward the other side in the front and back direction of the vehicle in a state of lying substantially vertically and connected to the top plate 560F, a second side extension plate 580b (see FIGS. 17 and 21) extending from the edge on the other side of the second side plate 550b toward the other side in the front and back direction of the vehicle in a state of lying substantially vertically and connected to the top plate 560F, and a third connecting plate 585F (see FIGS. 17 and 21) extending in the vehicle width direction in a state of lying substantially vertically so as to connect edges on the other side in the front and back direction of the vehicle of the first side extension plate 580a and the second side extension 580b, and a edge on the other side in the front and back direction of the vehicle of the top plate 560F, thereby enhancing the strength of the attachment frame 500F.

In a case where the first and second connecting plates 570F, 575F are provided, it is possible to provide the free space as much as possible by having the first and second connecting plates 570F, 575F gate-shaped when seen from the front.

At the second connecting plate 575F, an opening 576F (see FIG. 22) through which the traveling belt 13 passes, and an opening (not shown) through which the working machine belt 23 passes are formed.

At the first connecting plate 570F, an opening 571F (see FIG. 18) through which the working machine belt 23 passes is formed.

In the HST 100F, the hydraulic pump unit 300F, the first hydraulic motor unit 200a and the second hydraulic motor unit 200b are independently supported by the attachment frame 500F. Therefore, the replacing work and the maintenance work of the hydraulic units can be easily carried out.

Furthermore, in the HST unit 100F, the conduit connecting work between the first and second hydraulic pump main bodies 310a, 310b, and the first and second hydraulic motor main bodies 210a, 210b can also be carried out without assembling the hydraulic pump unit 300F as well as the first and second hydraulic motor units 200a, 200b to the vehicle frame 30.

In other words, in the HST 100F, it is possible to complete the connecting work between the first hydraulic pump main body 310a and the first hydraulic motor main body 210a by fluidly connecting the first hydraulic pump-side operational fluid ports 355a(P) and the first hydraulic motor-side operational fluid ports 255a(P) by means of the first operational fluid conduit 480a; and complete the connecting work between the second hydraulic pump main body 310b and the second hydraulic motor main body by fluidly connecting the second hydraulic pump-side operational fluid ports 355a(P) and the second hydraulic motor-side operational fluid ports 255b(P) by means of the second operational fluid conduit 480b, in a state where the hydraulic pump unit 300F as well as the first and second hydraulic motor units 200a, 200b are attached only to the attachment frame 500A, without attaching these units to the vehicle frame.

That is, in the HST unit 100F, the conduit connecting work could be carried out irrespective of the assembly work to the vehicle frame.

The first operational fluid conduit 480a and the second operational fluid conduit 480b are preferably supported by the attachment frame 500F, as shown in FIG. 18.

Further, the adjustment work of the traveling hydrostatic transmission configured by the hydraulic pump unit 300F as well as the first and second hydraulic motor units 200a, 200b could be more efficient in the HST unit 100F.

Specifically, in the HST unit 100F, it is possible that the first and second hydraulic pump main bodies 310a, 310b and the first and second hydraulic motor main bodies are fluidly connected in a state corresponding to the usage state before attaching the hydraulic pump unit 300F, the first hydraulic motor unit 200a and the second hydraulic motor unit 200b to the vehicle frame 30, as explained above.

Therefore, the adjustment work of the traveling hydrostatic transmission could be carried out irrespective of the vehicle main body.

In particular, in a case where the hydraulic equipment manufacturing company manufactures the hydraulic pump unit and the hydraulic motor unit, and the vehicle manufacturing company attaches the hydraulic pump unit and the hydraulic motor unit to the vehicle frame and completes the working vehicle, the HST unit 100F allows the hydraulic equipment manufacturing company to carry out the adjustment work of the hydraulic pump unit and the hydraulic motor unit in a state corresponding to the vehicle mounted state before shipment of the traveling hydrostatic transmission. Therefore, the vehicle manufacturing company could assemble the traveling hydrostatic transmission to the vehicle frame, only with an extremely simple work of attaching the attachment frame 500F to the vehicle frame.

Further, the attachment frame 500F is configured so that the first and second motor supporting surfaces 510a, 510b are positioned respectively at one side and the other side in the vehicle width direction, and the top plate 560F supports the driving power source 40F and the hydraulic pump unit 300F above the first and second motor supporting surfaces 510a, 510b, as described above.

Therefore, the pair of hydraulic motor units 200a, 200b can be arranged in a distributed manner in the vehicle width direction so as to provide the free space between the driving wheels 50a, 50b by simply attaching the attachment frame 500F to the vehicle frame 30.

Such effect is particularly effective in the working vehicle, for example, needing to stabilize the body posture at the time of turning in place (zero turn).

In the working vehicle 1F, a PTO system power transmission mechanism 20F and the duct 80 are arranged in the free space, as shown in FIG. 18.

Moreover, the working vehicle 1F includes a reservoir tank 900 that is an oil source of the operational fluid in the traveling hydrostatic transmission configured by the hydraulic pump unit 300F, the first hydraulic motor unit 200a, and the second hydraulic motor unit 200b.

Specifically, the reservoir tank 900 is fluidly connected with the inner space of the first motor case 230a via a first motor-side conduit 490a having a first end fluidly connected to the first motor-side drain port 245a(P), the inner space of the second motor case 230b via a second motor-side conduit 490b having a first end fluidly connected to the second motor-side drain port 245b(P), and the inner space of the pump case 330F via a pump-side conduit 491 having a first end fluidly connected to the pump-side drain port 345(P).

Furthermore, the reservoir tank 900 is fluidly connected to the suction passage 425 via a charge conduit 495 having a first end fluidly connected to the suction port 425(P).

In the present embodiment, the thus constructed reservoir tank 900 is also supported by the attachment frame 500F.

Specifically, the top plate 560F of the attachment frame 500F supports the reservoir tank 900 at the upper surface, in addition to the driving power source 40F and the hydraulic pump unit 300F.

Preferably, a filter unit 950 is further provided so as to filer the oil introduced into the suction passage 425 from the reservoir tank 900.

In the present embodiment, the filter unit 950 is separate from the reservoir tank 900, as shown in FIGS. 21 and 22.

The independent filter unit 950 may be supported on the upper surface of the top plate 560F in a state of interposed in the charge conduit 495.

It is possible to provide an inner packaging type filter unit at an outlet port of the reservoir tank 900, instead of the independent filter unit 950.

Seventh Embodiment

The seventh embodiment of the HST unit according to the present invention will now be described with reference to the accompanied drawings.

Figure 23:
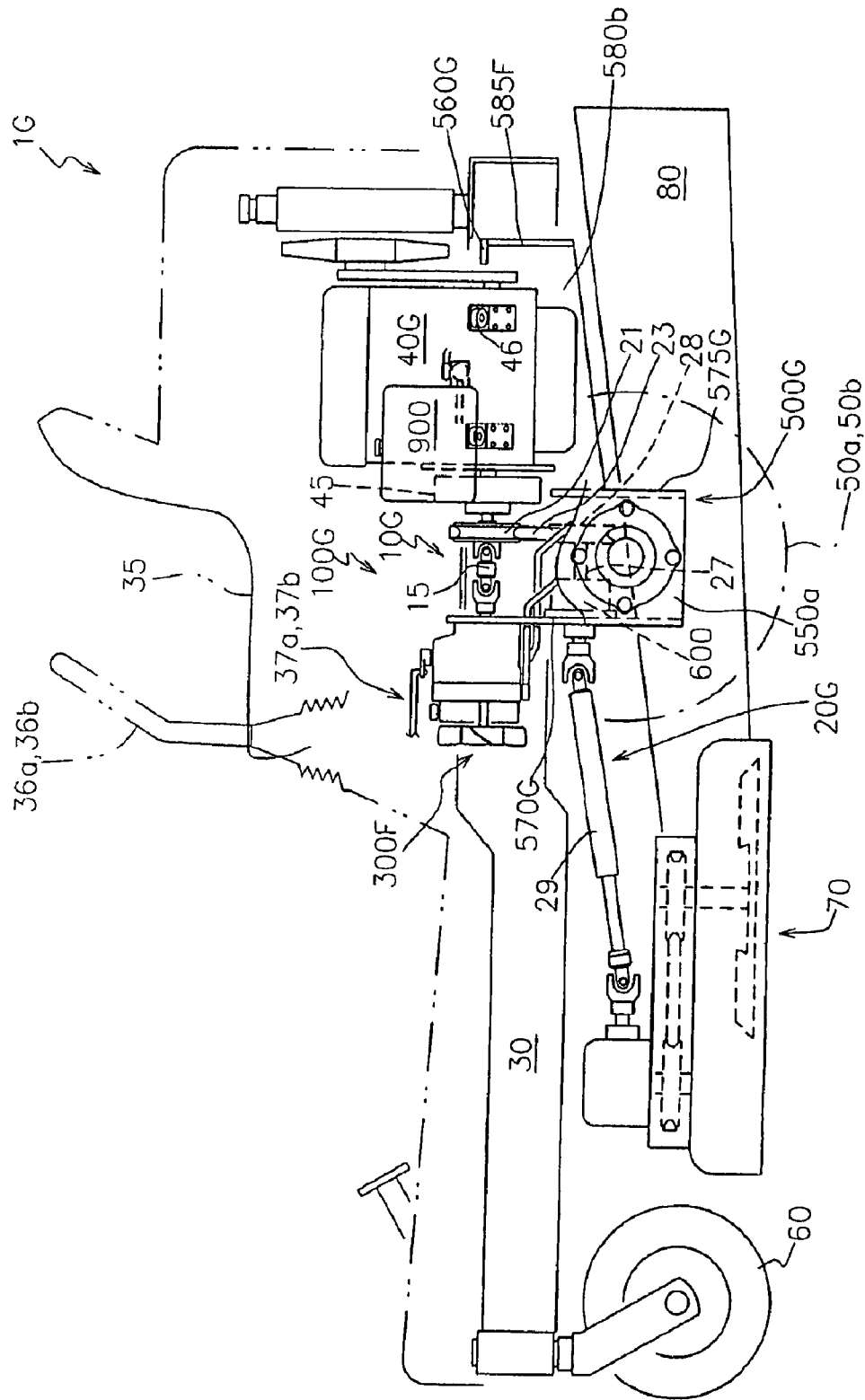
FIG. 23 is a side view of a working vehicle to which an HST unit according to a seventh embodiment of the present invention is applied.
Figure 24:
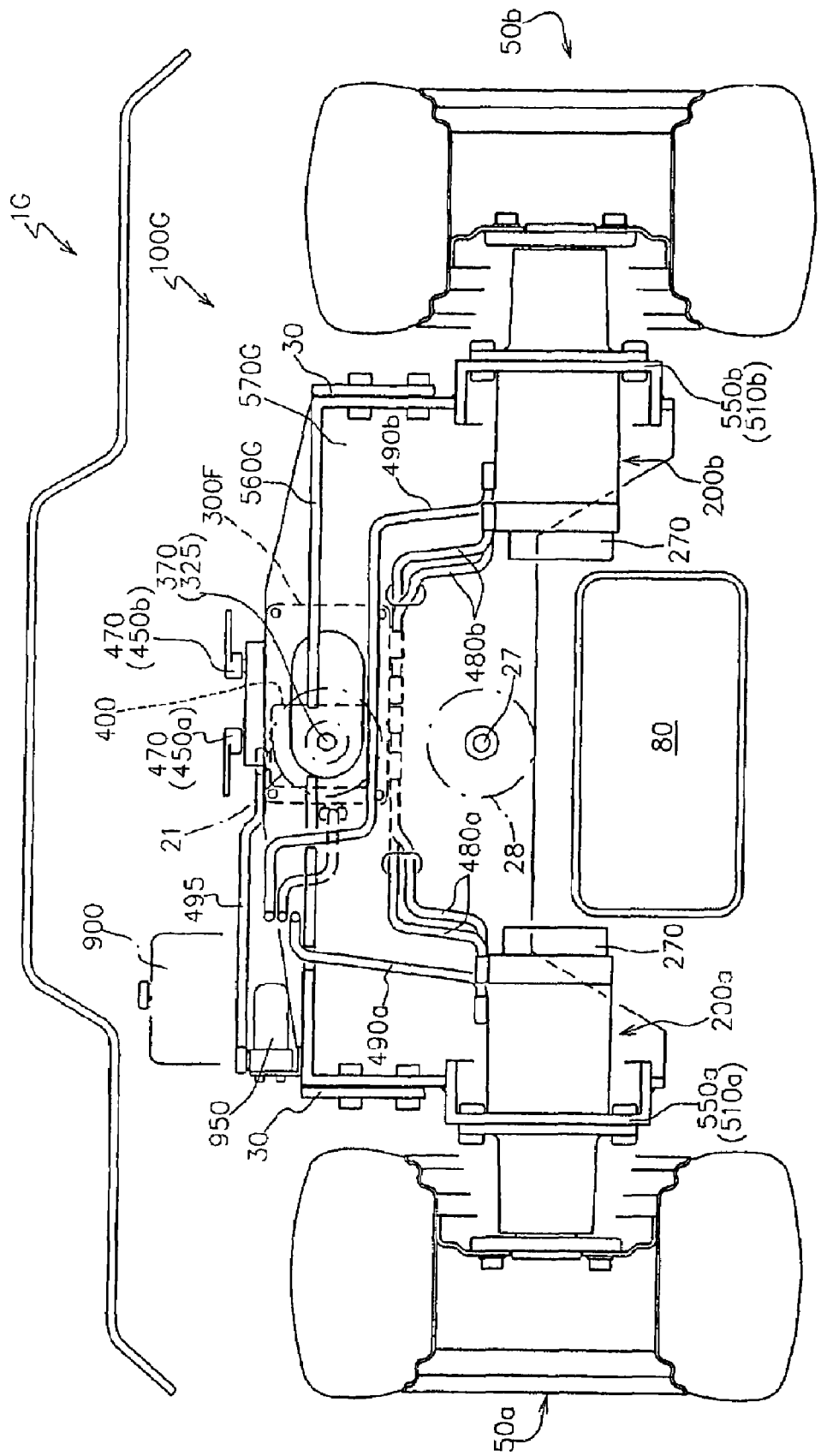
FIG. 24 is a partial rear view of the working vehicle shown in FIG. 23.

FIG. 23 and FIG. 24 are a side view and a partial rear view, respectively, of a working vehicle 1G to which the HST unit 100G according to the present embodiment is applied.

Figure 25:
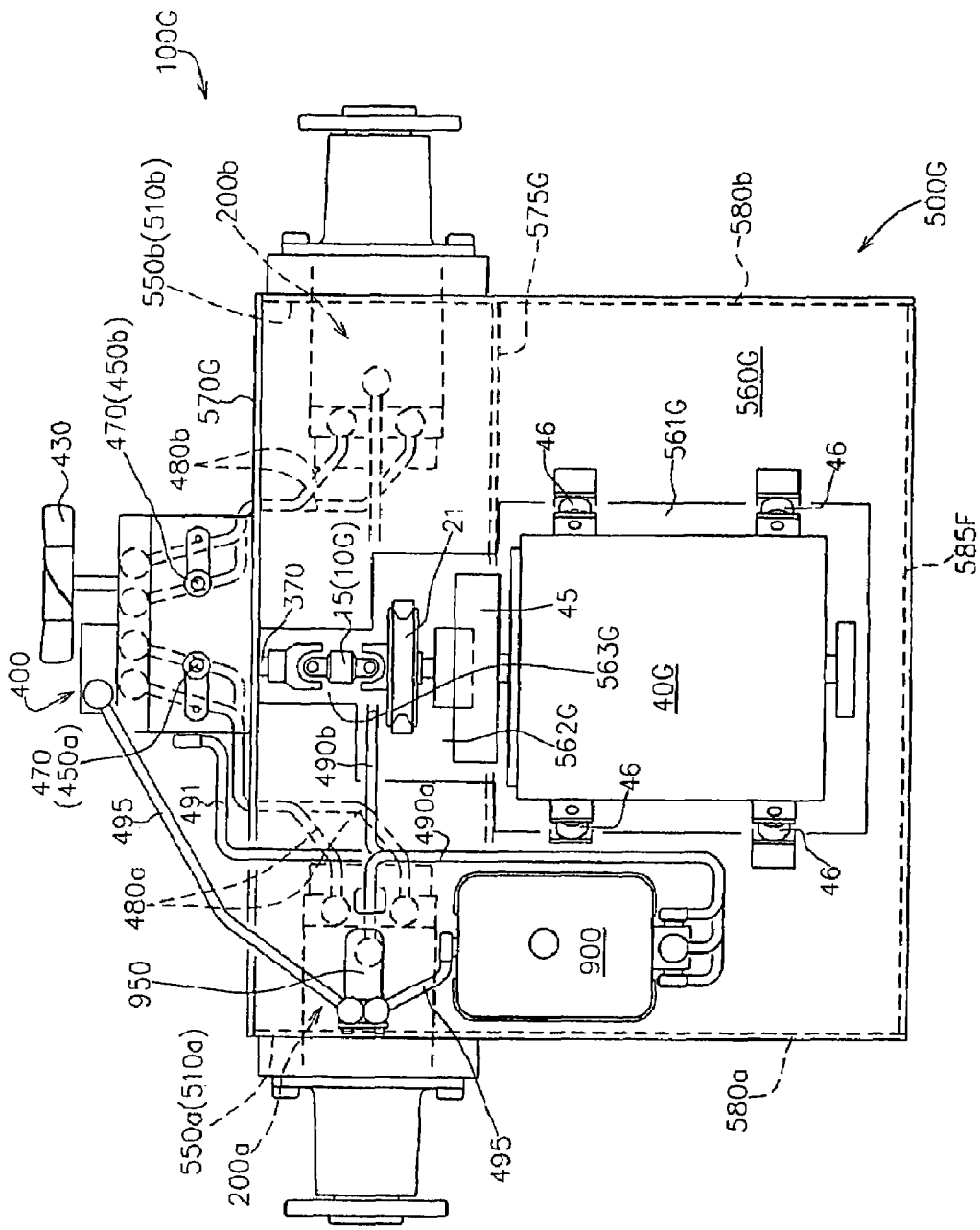
FIG. 25 is a plane view of the HST unit according to the seventh embodiment.

FIG. 25 is a plane view of the HST unit 100G according to the present embodiment.

In the figure, the same reference characters are denoted for the members same as those in the above embodiments, and thus the explanation thereof is omitted.

The HST unit 100G according to the present embodiment is configured so as to be applied to the working vehicle 1G including a horizontal crankshaft type driving power source 40G.

Specifically, the working vehicle 1G includes the vehicle frame 30, the HST unit 100G according to the present embodiment, the driving power source 40G of a horizontal crank shaft type that act as a power source for the hydraulic pump unit 100G, a traveling system power transmission mechanism 10G for transmitting the power from the driving power source 40G to the HST unit 100G, the first and second driving wheel 50a, 50b, the caster wheels 60, the working machine 70, a PTO system power transmission mechanism 20G for transmitting the power from the driving power source 40G to the working machine 70, the duct 80, the reservoir tank 900, and the filter unit 950.

The HST unit 100G includes an attachment frame 500G in place of the attachment frame 500F in the HST unit 100F according to the sixth embodiment.

Specifically, the HST unit 100G includes the first hydraulic motor unit 200a, the second hydraulic motor unit 200b, the hydraulic pump unit 300F, and an attachment frame 500G for supporting the driving power source 40G, the hydraulic pump unit 300F, the first and second hydraulic motor unit 200a, 200b, the reservoir tank 900 and the filter unit 950 while providing a free space between the first and second driving wheels 50a, 50b.

The attachment frame 500G is configured so as to support the driving power source 40G so that the driving shaft 41 extends horizontally and support the hydraulic pump unit 300F so that the input shaft 370 extends horizontally, in a state of being attached to the vehicle frame 30.

Specifically, as shown in FIGS. 23 to 25, the attachment frame 500G integrally includes the first side plate 550a configuring the first motor supporting surface 510a, the second side plate 550b configuring the second motor supporting surface 510b, a top plate 560G extending in the width direction and in the fore-and-aft direction of the vehicle in a state of being substantially horizontally so as to connect the first and second side plates 550a, 550b, and a first connecting plate 570G extending in the vehicle width direction in a state of being substantially vertically so as to connect edges on one side (front edges in this embodiment) in the front and back direction of the vehicle of the first side plate 550a and the second side plate 550b.

The attachment frame 500G is so configured that the top plate 560G supports the driving power source 40G and the first connecting plate 570G supports the hydraulic pump unit 300F.

As shown in FIG. 25, the top plate 560G supports the driving power source 40G so that the driving shaft 41 extends horizontally toward the front.

In the present embodiment, as shown in FIG. 23, the driving power source 40G is supported on the upper surface of the top plate 560G so that at least a part of the power source 40G is positioned below the top plate 560G, thereby allowing the vertical position of the driving shaft 41 to be adjusted.

Specifically, as shown in FIG. 25, the top plate 560G is provided with a first opening 561G corresponding to the driving power source 40G. The driving power source 40G is supported by the top plate 560G by way of four rubber vibration isolators 46 arranged at the front and the back and at the left and the right, in a state of being within the first opening 561G so that at least a part of the driving power source 40G is positioned below the top plate 560G.

In the present embodiment, as shown in FIGS. 23 and 25, a flywheel 45 is supported on the driving shaft 41. The driving shaft 41 is operatively connected with the input shaft of the hydraulic pump unit 300F via the flywheel 45 and a transmission shaft 15 with universal joints configuring the traveling system power transmission mechanism 10G.

In order to prevent the flywheel 45 and the transmission shaft with universal joints 15 from interfering with the top plate 560G, the top plate 560G is provided with a second opening 562G corresponding to the flywheel and a third opening 563G corresponding to the transmission shaft with universal joints 15, in addition to the first opening 561G (see FIG. 25).

As shown in FIG. 25, the reservoir tank 900 and the filter unit 950 are supported by the top plate 560G at desired position other than the first to third openings 561G-563G.

The first connecting plate 570G is configured to support the hydraulic pump unit 300F so that the input shaft 370 extends horizontally toward the rear.

Specifically, the first connecting plate 570G is provided with an opening through with the input shaft 370 passes. The first connecting plate 570G supports the hydraulic pump unit 300F at its front surface in a state where the input shaft 370 extends rearward through the opening.

Preferably, the first connecting plate 570G may support the hydraulic pump unit 300F so that the input shaft 370 is positioned coaxially with the driving shaft 41.

In the present embodiment, as shown in FIG. 24, the first connecting plate 570G is configured so that at least a part of the plate 570G projects upwardly beyond the top plate 560G. The first connecting plate 570G supports the hydraulic pump unit 300F by utilizing the upward projecting portion so that the vertical position of the input shaft 370 is set coaxially with the driving shaft 41.

In this embodiment, as shown in FIGS. 23-25, the attachment frame 500G integrally includes a second connecting plate 575G extending in the vehicle width direction in a state of lying substantially vertically so as to connect edges on the other side (rear edges in this embodiment) in the front and back direction of the vehicle of the first side plate 550a and the second side plate 550b, a first side extension plate 580a (see FIG. 25) extending from the edge on the other side of the first side plate 550a toward the other side in the front and back direction of the vehicle in a state of lying substantially vertically and connected to the top plate 560G, a second side extension plate 580b (see FIGS. 23 and 25) extending from the edge on the other side of the second side plate 550b toward the other side in the front and back direction of the vehicle in a state of lying substantially vertically and connected to the top plate 560G, and a third connecting plate 585F (see FIGS. 23 and 25) extending in the vehicle width direction in a state of lying substantially vertically so as to connect edges on the other side in the front and back direction of the vehicle of the first side extension plate 580a and the second side extension 580b, and a edge on the other side in the front and back direction of the vehicle of the top plate 560G, thereby enhancing the strength of the attachment frame 500G.

The PTO system power transmission mechanism 20G is so configured to operatively connect between the driving shaft 41 and the working machine 70.

Specifically, the PTO system transmission mechanism 20G includes the working machine driving pulley 21 attached to the transmission shaft with universal joints 15, an intermediate shaft 27 arranged parallel to and below the transmission shaft 15, a working machine intermediate pulley 28 attached to the intermediate shaft 27, the working machine belt 23 wound around the working machine driving pulley 21 and the working machine intermediate pulley 28, a transmission shaft 29 with universal joints having one end coupled to the input shaft of the working machine 70, and a PTO clutch device 600 interposed between the intermediate shaft 27 and the transmission shaft 29, the PTO clutch device 600 selectively engaging or disengaging the power transmission from the intermediate shaft 27 to the transmission shaft 29.

The working machine driving pulley 21 and the working machine belt 23 are positioned within the second opening 562G of the top plate 560G, so as to prevent interference with the top plate 560G.

The PTO clutch device 600 is supported by the attachment frame 500G.

That is, the attachment frame 500G is configured so as to support the PTO clutch device 600 interposed in the PTO system transmission path from the driving power source 40G to the working machine 70, in addition to the driving power source 40G, the hydraulic pump unit 300F, the first and second hydraulic motor units 200*a*, 200*b*, the reservoir tank 900 and the filter unit 950.

In the present embodiment, the PTO clutch device 600 is supported at a region below the region for supporting the hydraulic pump unit 300F, of the first connecting plate 570G.

That is, the first connecting plate 570G has an upper region forming a pump supporting surface for supporting the hydraulic pump unit 300F, and a lower region forming another supporting surface for supporting the PTO clutch device 600.

In the present embodiment, the hydraulic pump unit 300F is supported by the front surface of the first connecting plate 580G, and the PTO clutch device 600 is supported by the rear surface of the first connecting plate 580G.

In the present embodiment, as shown in FIG. 24, the first and second connecting plates 570G, 575G have a gate shape when seen from the front, thereby providing the free space between the first and second driving wheels 50*a*, 50*b* as much as possible.

The duct 80 is arranged in the free space in the present embodiment.

The effects similar to the sixth embodiment are also obtained in the HST unit 100G.

Eighth Embodiment

The eighth embodiment of the HST unit according to the present invention will now be described with reference to the accompanying drawings.

Figure 26:
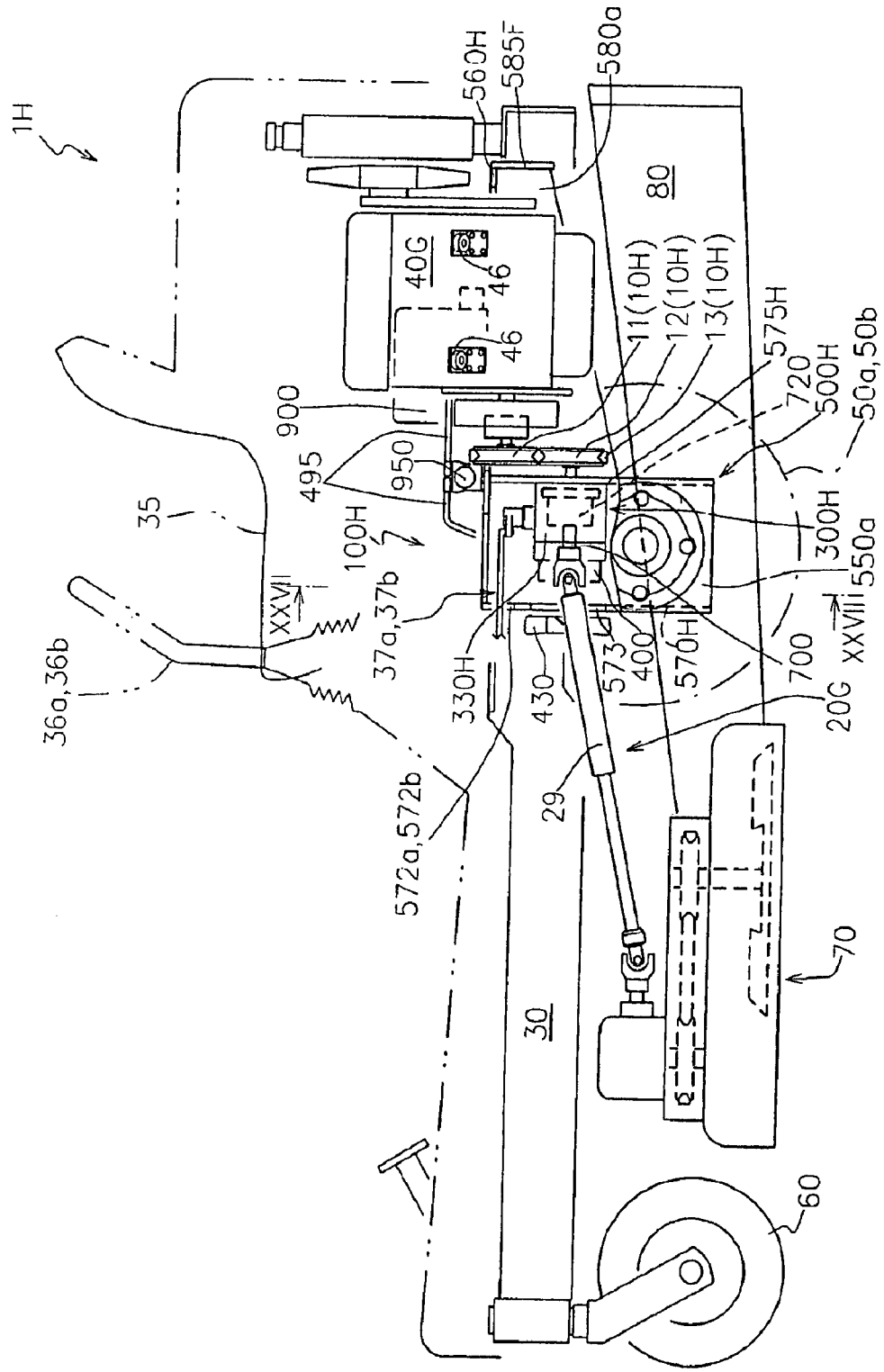
FIG. 26 is a side view of a working vehicle to which an HST unit according to an eighth embodiment of the present invention is applied.

FIG. 26 is a side view of a working vehicle 1H to which the HST unit 100H according to the present embodiment is applied.

Figure 27:
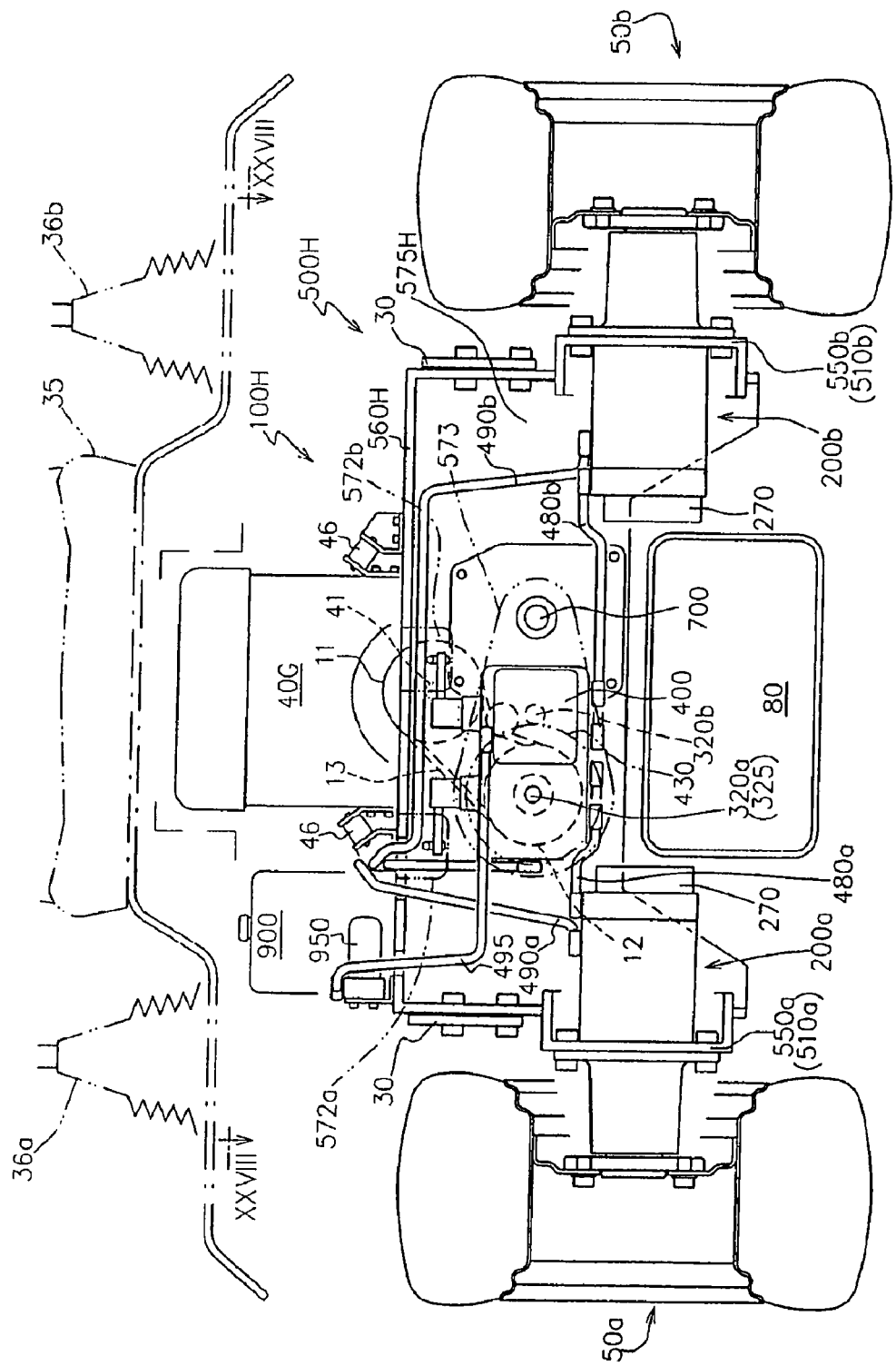
FIG. 27 is a cross sectional view taken along line XXVII-XXVII in FIG. 26.
Figure 28:
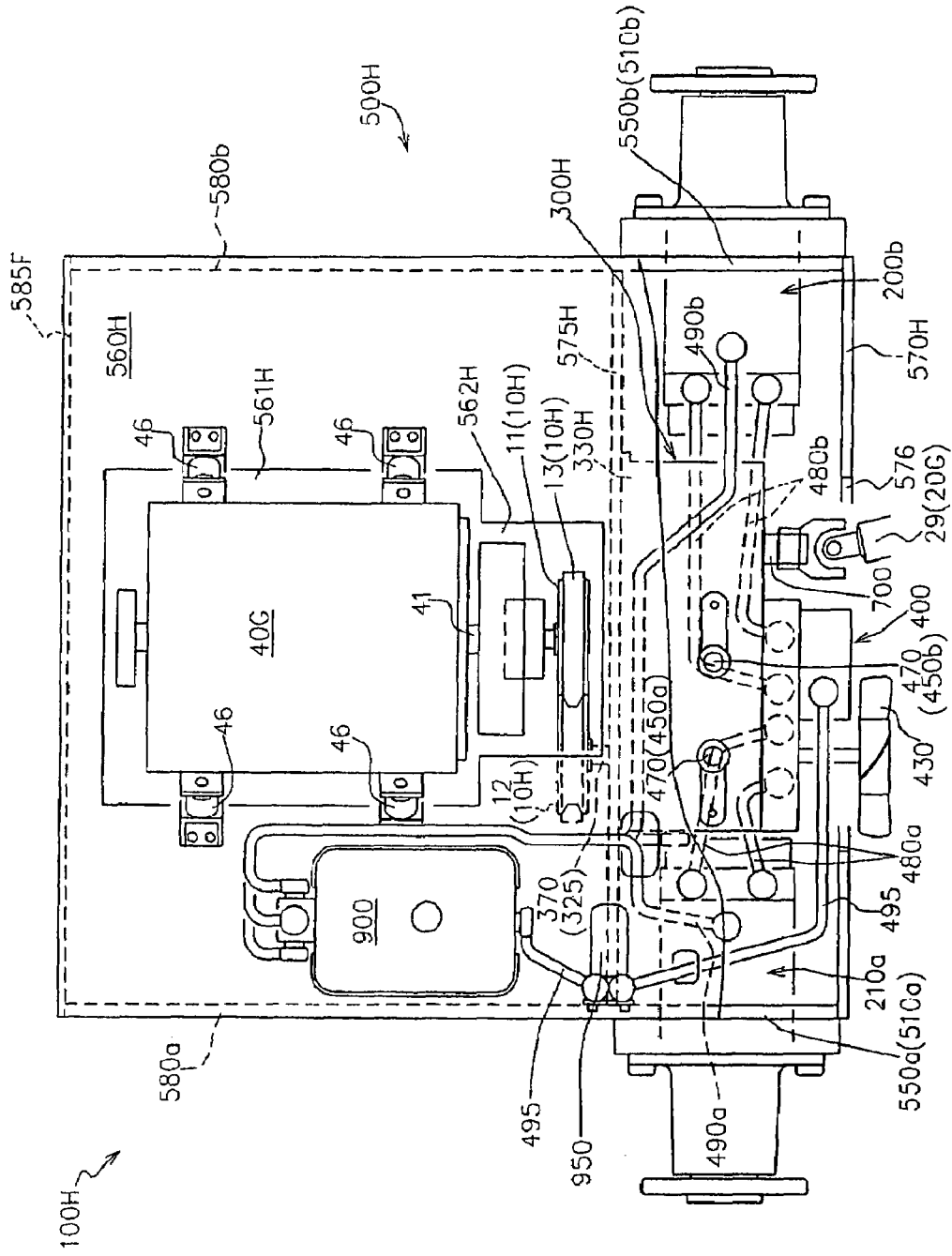
FIG. 28 is a plane view taken along line XXVIII-XXVIII in FIG. 27.

FIG. 27 and FIG. 28 are a vertical sectional front view of the HST unit 100H taken along line XXVII-XXVII in FIG. 26 and a plane view of the HST unit 100H taken along line XXVIII-XXVIII in FIG. 27.

In the figure, the same reference characters are denoted for the members same as those in the above embodiments, and thus the explanation thereof is omitted.

The HST unit 100H according to the present embodiment configures the traveling hydrostatic transmission of a working vehicle 1H, and also configures a part of the PTO system transmission path from the driving power source to the working machine 70.

In the present embodiment, the working vehicle 1H includes the horizontal crankshaft type driving power source 40G.

Specifically, the working vehicle 1H includes the vehicle frame 30, the HST unit 100H according to the present embodiment, the driving power source 40G of a horizontal crankshaft type that act as a power source for the hydraulic pump unit 100H, a traveling system power transmission mechanism 10H for transmitting the power from the driving power source 40G to the HST unit 100H, the first and second driving wheel 50*a*, 50*b*, the caster wheels 60, the working machine 70, the PTO system power transmission mechanism 20G for transmitting the power from the driving power source 40G to the working machine 70, the duct 80, the reservoir tank 900, and the filter unit 950.

The HST unit 100H includes the first hydraulic motor unit 200*a*, the second hydraulic motor unit 200*b*, the hydraulic pump unit 300H, and an attachment frame 500H for supporting the driving power source 40G, the hydraulic pump unit 300H, the first and second hydraulic motor unit 200*a*, 200*b*, the reservoir tank 900 and the filter unit 950 while providing a free space between the first and second driving wheels 50*a*, 50*b*.

The hydraulic pump unit 300H is configured to rotatably drive the first and second hydraulic pump main bodies 310*a*, 310*b* through operational fluid by the power from the driving power source 40G, and to externally output the power from the driving power source 40G.

In other words, the hydraulic pump unit 300H includes the input shaft 370 operatively connected to the driving power source 40G via the traveling system transmission mechanism 10H, the first and second pump shafts 320*a*, 320*b*, a traveling transmission mechanism (not shown), such as a gear train, for transmitting the power from the input shaft 370 to the first and second pump shafts 320*a*, 320*b*, the first and second hydraulic pump main bodies 310*a*, 310*b* supported in a relatively non-rotatable manner at the first and second pump shafts 320*a*, 320*b*, respectively, the PTO shaft 700 for externally outputting the rotational power, a PTO transmission mechanism, such as a gear train, for transmitting the power from the input shaft 370 to the PTO shaft 700, and a pump case 330H for accommodating the first hydraulic pump main body 310*a*, the second hydraulic pump main body 310*b*, the traveling transmission mechanism and the PTO transmission mechanism, and for supporting the input shaft 370, the first pump shaft 320*a*, the second pump shaft 320*b* and the PTO shaft 700 in a rotatable manner about respective axis line.

The hydraulic pump unit 300H further includes at least one charge pump unit 400 and at least one cooling fan 430, as similar to the hydraulic pump unit 300F.

The charge pump unit 400 is rotationally driven by the first or second pump shaft 320*a*, 320*b*.

Similarly, the cooling fan 430 is rotationally driven by the first or second pump shaft 320*a*, 320*b*.

In the illustrated embodiment, the charge pump unit 400 is rotationally driven by the second pump shaft 320*b*, and the cooling fan 430 is rotationally driven by the first pump shaft 320*a*.

The PTO transmission mechanism includes a PTO hydraulic clutch device 720 (see FIG. 26) for selectively engaging or disengaging the power transmission from the input shaft 370 to the PTO shaft 700.

The PTO transmission mechanism preferably includes the PTO brake device (not shown) that prevents the PTO shaft 700 from continuously rotating due to the force of inertia when the PTO hydraulic clutch device disengages the power transmission.

The attachment frame 500H is configured so as to support the driving power source 40G so that the driving shaft 41 extends horizontally and support the hydraulic pump unit 300H so that the input shaft 370 extends horizontally, in a state of being attached to the vehicle frame 30, as similar to the attachment frame 500G.

Specifically, as shown in FIGS. 26-28, the attachment frame 500H integrally includes the first side plate 550*a* configuring the first motor supporting surface 510*a*, the second side plate 550*b* configuring the second motor supporting surface 510*b*, a top plate 560H extending in the width direction and in the fore-and-aft direction of the vehicle in a state of being substantially horizontally so as to connect the first and second side plates 550*a*, 550*b*, a first connecting plate 570H extending in the vehicle width direction in a state of being substantially vertically so as to connect edges on one side (front edges in this embodiment) in the front and back direction of the vehicle of the first side plate 550*a* and the second side plate 550*b*, and a second connecting plate 575H extending in the vehicle width direction in a state of being substantially vertically so as to connect edges on the other side (rear edges in this embodiment) in the front and back direction of the vehicle of the first side plate 550*a* and the second side plate 550*b*.

The driving power source 40G is supported by the top plate 560H.

That is, in the attachment frame 500H, the top plate 560H configures a driving source supporting surface for supporting the driving power source 40G, as similar to the attachment frame 500G.

Specifically, the top plate 560H supports the driving power source 40G so that the driving shaft 41 extends horizontally toward the front.

The top plate 560H supports the driving power source 40G so that at least a part of the driving power source 40G is positioned below the top plate 560H, as similar to the seventh embodiment.

Specifically, as shown in FIG. 28, the top plate 560H is provided with a first opening 561H corresponding to the driving power source 40G. The driving power source 40G is supported by the top plate 560H by way of four rubber vibration isolators 46 arranged at the front and the back and at the left and the right, in a state of being within the first opening 561H so that at least a part of the driving power source 40G is positioned below the top plate 560H.

The hydraulic pump unit 300H is supported by the attachment frame 500H in a state of being within a space surrounded by the first side plate 550*a*, the second side plate 550*b*, the first connecting plate 570H, the second connecting plate 575H and the top plate 560H.

In the present embodiment, as shown in FIGS. 26-28, of the second connecting plate 575H, an inner surface facing the first connecting plate 570H configures a pump supporting surface for supporting the hydraulic pump unit 300H.

Specifically, the second connecting plate 575H is provided with an opening through which the input shaft 370 can pass.

The second connecting plate 575H supports the hydraulic pump unit 300H at the inner surface so that the input shaft 370 lies horizontally and projects outwardly from the space toward the approaching direction to the driving power source 40G through the opening.

As shown in FIGS. 26 and 27, the first connecting plate 570H is provided with openings through which the link mechanism 37*a*, 37*b* pass, respectively, and an opening through which the transmission shaft 29 passes.

In the present embodiment, the input shaft 370 is so configured that its rotational axis line is directed along the fore-and-aft direction of the vehicle as similar to the driving shaft 41 of the driving power source 40G, but the position of the rotational axis line is offset in the vertical direction and in the vehicle width direction with respect to the driving shaft 41.

Therefore, the traveling system power transmission mechanism 10H is a pulley-belt transmission mechanism including the travel driving pulley 11, the travel driven pulley 12, and the travel belt 13.

In order to allow the driving shaft 41 and the input shaft 370 to be connected by the traveling system power transmission mechanism 10H, the top plate 560H is provided with a second opening 562H (see FIG. 28) corresponding to the flywheel and the travel driving pulley 11, in addition to the first opening 561H.

As shown in FIG. 28, the reservoir tank 900 and the filter unit 950 are supported by the top plate 560H at desired position other than the first and second openings 561H, 562H, as similar to the seventh embodiment.

The effects similar to the sixth and seventh embodiments are also obtained in the HST unit 100H.

Preferably, as shown in FIGS. 26-28, the attachment frame 500H may integrally include a first side extension plate 580*a* (see FIGS. 26 and 28) extending from the edge on the other side of the first side plate 550*a* toward the other side in the front and back direction of the vehicle in a state of lying substantially vertically and connected to the top plate 560H, a second side extension plate 580*b* (see FIG. 28) extending from the edge on the other side of the second side plate 550*b* toward the other side in the front and back direction of the vehicle in a state of lying substantially vertically and connected to the top plate 560H, and a third connecting plate 585F (see FIGS. 26 and 28) extending in the vehicle width direction in a state of lying substantially vertically so as to connect edges on the other side in the front and back direction of the vehicle of the first side extension plate 580*a* and the second side extension 580*b*, and a edge on the other side in the front and back direction of the vehicle of the top plate 560H, thereby enhancing the strength of the attachment frame 500H.

A hydraulic pump unit in which both the first and second hydraulic pump main bodies 310*a*, 310*b* are accommodated in a single pump case 330F, 330H has been explained by way of example in each of the above embodiments, but the present invention is not limited thereto.

In other words, a pair of first and second hydraulic pump units that are supported independently to each other by the attachment frame may be employed as the hydraulic pump unit.

In such embodiment, the first and second hydraulic pump units are fluidly connected to the first and second hydraulic motor units, respectively.

Further, in each of the above embodiments, the attachment frame 500F-500H is so configured to support the driving power source 40F, 40G, but the present invention in not limited the configuration.

That is, it is possible that the attachment frame 500F-500H are configured to support only the hydraulic pump unit 300F or 300H, the first hydraulic motor unit 200*a*, the second hydraulic motor unit 200*b* and the reservoir tank 900 (and the independent filter unit 950). In the configuration, the driving power source 40F, 40G are directly supported by the vehicle frame 30.

Furthermore, in each embodiment, an example in which the first and second hydraulic pump main bodies 310*a*, 310*b* are independently fluidly connected to the first and second hydraulic motor main bodies 210*a*, 210*b*, respectively, is given by way of example, but the present invention is not limited thereto.

In other words, the first and second hydraulic motor main bodies 210*a*, 210*b* may be fluidly connected by a pair of motor-side conduits, and the pair of motor-side conduits and a single traveling hydraulic pump main body may be fluidly connected.

For instance, one of the first or the second hydraulic pump main body 310*a*, 310*b* in each embodiment may be used as the traveling hydraulic pump main body.

In this case, the other one of the first or the second hydraulic pump main body 310*a*, 310*b* may be omitted, or the other one of the first or the second hydraulic pump main body 310*a*, 310*b* may be used as a hydraulic pressure source for other hydraulic equipments.

Furthermore, although, in each embodiment, the reservoir tank 900 and the filter unit 950 are supported by the top plates 560f-560H, it is off course possible that the reservoir tank 900 and/or the filter unit 950 could be supported by the other portions of the attachment frames 500F-500H.

This specification is by no means intended to restrict the present invention to the preferred embodiments set forth therein. Various modifications to the HST unit may be made by those skilled in the art without departing from the spirit and scope of the present invention as defined in the appended claims.

What is claimed is:

1. An HST unit applied to a working vehicle comprising:
a first hydraulic motor unit capable of being independently mounted to the working vehicle, the first hydraulic motor unit including a first motor shaft, a first hydraulic motor main body supported by the first motor shaft in a relatively non-rotatable manner with respect to the first motor shaft, and a first motor case accommodating the first motor main body and supporting the first motor shaft in a rotatable manner around an axis line, the first motor case being formed with a pair of first motor-side operational fluid passages having first ends fluidly connected to the first motor main body and second ends opened to an outer surface to form a pair of first motor-side operational fluid ports;
a second hydraulic motor unit capable of being independently mounted to the working vehicle, the second hydraulic motor unit including a second motor shaft, a second hydraulic motor main body supported by the second motor shaft in a relatively non-rotatable manner with respect to the second motor shaft, and a second motor case accommodating the second motor main body and supporting the second motor shaft in a rotatable manner around an axis line, the second motor case being formed with a pair of second motor-side operational fluid passages having first ends fluidly connected to the second motor main body and second ends opened to an outer surface to form a pair of second motor-side operational fluid ports; and
a hydraulic pump unit capable of being independently mounted to the working vehicle, the hydraulic pump unit including first and second pump shafts, first and second hydraulic pump main bodies respectively supported by the first and second pump shafts in a relatively non-rotatable manner with respect thereto, and a pump case accommodating the first and second pump main bodies and supporting the first and second pump shafts in a rotatable manner around respective axis lines, the pump case being formed with a pair of first pump-side operational fluid passages having first ends fluidly connected to the first pump main body and second ends opened to an outer surface to form a pair of first pump-side operational fluid ports and a pair of second pump-side operational fluid passages having first ends fluidly connected to the second pump main body and second ends opened to an outer surface to form a pair of second pump-side operational fluid ports;
wherein the hydraulic pump unit and the first and second hydraulic motor units form an assembly capable of being integrally and detachably mounted to the working vehicle in a state that the pair of first pump-side operational fluid ports are fluidly connected to the pair of first motor-side operational fluid ports, respectively, and the pair of second pump-side operational fluid ports are fluidly connected to the pair of second motor-side operational fluid ports, respectively.

2. An HST unit according to claim 1, wherein:
the first and second hydraulic motor units are respectively positioned on one side and the other side along a first direction with the hydraulic pump unit therebetween so that the first and second hydraulic motor units are respectively positioned on first and second sides in a vehicle width direction with reference to the hydraulic pump unit when the HST unit is mounted to the working vehicle,
the first motor shaft has an output end extending outward from the first motor case toward the one side along the first direction, and
the second motor shaft is positioned coaxially with the first motor shaft and has an output end extending outward from the second motor case toward the other side along the first direction.

3. An HST unit according to claim 2, wherein:
the pump case is disposed so that at least part of the pump case is positioned at the same position as the first and second motor cases with respect to the longitudinal direction of the working vehicle when the HST unit is mounted to the working vehicle.

4. An HST unit according to claim 1, wherein:
the hydraulic pump unit includes a power transmission mechanism accommodated in the pump case and operatively connecting the first and second pump shafts,
the first and second pump shafts are orthogonal to the first and second motor shafts, and
one of the first and second pump shafts includes an input end extending outward from the pump case so as to be capable of operatively connecting to a driving source in the working vehicle.

5. An HST unit according to claim 1, further comprising a reservoir tank for storing an operational fluid used in the HST unit, the reservoir tank being supported by the assembly.

6. An HST unit according to claim 5, further comprising a filter unit for filtering the operational fluid flown into the HST unit from the reservoir tank, the filter unit being supported by the assembly.

* * * * *